(12) United States Patent
Kishikawa et al.

(10) Patent No.: US 11,217,042 B2
(45) Date of Patent: Jan. 4, 2022

(54) VEHICLE MONITORING APPARATUS, FRAUD DETECTION SERVER, AND CONTROL METHODS

(71) Applicant: Panasonic Intellectual Property Corporation of America, Torrance, CA (US)

(72) Inventors: Takeshi Kishikawa, Osaka (JP); Tomoyuki Haga, Nara (JP); Yuishi Torisaki, Osaka (JP); Takamitsu Sasaki, Osaka (JP); Hideki Matsushima, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 195 days.

(21) Appl. No.: 16/540,668

(22) Filed: Aug. 14, 2019

(65) Prior Publication Data
US 2019/0371085 A1   Dec. 5, 2019

Related U.S. Application Data

(63) Continuation of application No. PCT/JP2018/041295, filed on Nov. 7, 2018.
(Continued)

(51) Int. Cl.
 *G07C 5/00* (2006.01)
 *G07C 5/02* (2006.01)
 (Continued)

(52) U.S. Cl.
 CPC .............. *G07C 5/008* (2013.01); *G07C 5/02* (2013.01); *G07C 5/08* (2013.01)

(58) Field of Classification Search
 USPC .......................................... 701/29.3
 See application file for complete search history.

(56) References Cited

U.S. PATENT DOCUMENTS

| 6,765,495 | B1* | 7/2004 | Dunning | G08G 1/161 340/435 |
| 10,168,418 | B1* | 1/2019 | Al-Stouhi | G01S 7/023 |

(Continued)

FOREIGN PATENT DOCUMENTS

| JP | 2003-165417 | 6/2003 |
| JP | 2017-111796 | 6/2017 |

OTHER PUBLICATIONS

Partial Supplementary European Search Report dated Jan. 29, 2021 in corresponding European Patent Application No. 18901422.8.
(Continued)

*Primary Examiner* — Tyler D Paige
(74) *Attorney, Agent, or Firm* — Wenderoth, Lind & Ponack. L.L.P.

(57) ABSTRACT

A vehicle monitoring apparatus includes: a first communicator that receives specifying information for specifying a target vehicle from a server; and an acquirer that acquires driving information from the target vehicle, the driving information being information regarding driving of the target vehicle specified by the specifying information received by the first communicator. The first communicator transmits the driving information acquired by the acquirer to the server. For example, the acquirer may acquire the driving information obtained from the target vehicle through communication.

5 Claims, 21 Drawing Sheets

Related U.S. Application Data

(60) Provisional application No. 62/620,121, filed on Jan. 22, 2018.

(51) Int. Cl.
*H04W 4/029* (2018.01)
*H04L 29/08* (2006.01)
*G06Q 50/30* (2012.01)
*G08G 1/01* (2006.01)
*G08G 1/04* (2006.01)
*G07C 5/08* (2006.01)
*B60R 25/32* (2013.01)

(56) References Cited

U.S. PATENT DOCUMENTS

| | | |
|---|---|---|
| 2004/0176935 A1 | 9/2004 | Sproule et al. |
| 2010/0036595 A1 | 2/2010 | Coy et al. |
| 2010/0198478 A1* | 8/2010 | Shin ...................... B60W 10/06 701/96 |
| 2011/0264318 A1 | 10/2011 | Laforge et al. |
| 2015/0168173 A1* | 6/2015 | Lewis-Evans ... G08G 1/096811 701/454 |
| 2016/0210851 A1 | 7/2016 | Oshima et al. |
| 2017/0178498 A1* | 6/2017 | Mcerlean ............... G08G 1/166 |
| 2017/0261325 A1* | 9/2017 | Schroeder .............. G01C 21/04 |
| 2018/0132173 A1* | 5/2018 | Miramonti ........... H04W 48/18 |
| 2018/0295147 A1 | 10/2018 | Haga et al. |
| 2018/0322776 A1* | 11/2018 | Bararsani ............. G08G 1/0129 |
| 2019/0072641 A1* | 3/2019 | Al-Stouhi ............. G01S 13/931 |
| 2019/0303603 A1* | 10/2019 | Courtney .............. H04L 9/0894 |

OTHER PUBLICATIONS

International Search Report (ISR) dated Feb. 5, 2019 in International (PCT) Application No. PCT/JP2018/041295.
Extended European Search Report dated May 6, 2021 in counterpart European Patent Application No. 18901422.8.

* cited by examiner

FIG. 15

| PRIORITY | CONDITIONS FOR DETERMINING PRIORITY |
|---|---|
| HIGH | VEHICLE EXHIBITING ANOMALOUS BEHAVIOR SUCH AS SUDDEN ACCELERATION/DECELERATION OR UNSTEADY DRIVING IS OBSERVED IN THE SURROUNDINGS<br><br>ACCIDENT HAS ALREADY TAKEN PLACE |
| MEDIUM | VEHICLE EXHIBITING ANOMALOUS BEHAVIOR SUCH AS SUDDEN ACCELERATION/DECELERATION OR UNSTEADY DRIVING CANNOT BE CONFIRMED FROM MONITORING LOG<br><br>NO PARTICULAR ANOMALY IS OBSERVED IN VEHICLES THAT ARE PRESENT IN THE SURROUNDINGS, BUT VEHICLE LOG AND MONITORING LOG DO NOT MATCH WITH EACH OTHER |
| LOW | NO PARTICULAR ANOMALY IS OBSERVED IN VEHICLES THAT ARE PRESENT IN THE SURROUNDINGS |

FIG. 17

| LOG | CONTENT |
|---|---|
| VEHICLE LOG | SPEED: 20 km/h, SUDDEN BRAKING, LONGITUDINAL ACCELERATION XX, LATERAL ACCELERATION YY, ACCELERATOR POSITION ZZZ |
| MONITORING LOG L1 | SPEED: 0 km/h (SENSING), SPEED: 20 km/h (V2X COMMUNICATION), SUDDEN DECELERATION (DRIVER) |
| MONITORING LOG L2 | STOPPING (CAMERA), SPEED: 20 km/h (V2X COMMUNICATION) |

VEHICLE MONITORING APPARATUS, FRAUD DETECTION SERVER, AND CONTROL METHODS

CROSS REFERENCE TO RELATED APPLICATIONS

This application is a U.S. continuation application of PCT International Patent Application Number PCT/JP2018/041295 filed on Nov. 7, 2018, claiming the benefit of priority of U.S. Provisional Patent Application No. 62/620,121 filed on Jan. 22, 2018, the entire contents of which are hereby incorporated by reference.

BACKGROUND

1. Technical Field

The present disclosure relates to a vehicle monitoring apparatus, a fraud detection server, and control methods.

2. Description of the Related Art

In recent years, a plurality of devices called electronic control units (hereinafter referred to as "ECUs") are provided in a vehicle system. A network that connects the ECUs is called "vehicle-mounted network". There are many standards for vehicle-mounted networks, and a standard called Controller Area Network (hereinafter also referred to as "CAN") is one of the most widely used vehicle-mounted networks.

The CAN does not have a security function to handle cases where a fraudulent frame is transmitted, and thus a situation may occur in which a fraudulent node automatically connects to a CAN bus to fraudulently transmit a frame, and thereby fraudulently control a vehicle.

Japanese Unexamined Patent Application Publication No. 2017-111796 discloses a method for calculating the anomaly level of a frame transmitted to a vehicle-mounted network by uploading information regarding the frame transmitted to the vehicle-mounted network to a fraud detection server.

SUMMARY

However, with the method disclosed in Japanese Unexamined Patent Application Publication No. 2017-111796, if a frame uploaded by a fraudulent vehicle is falsified, it is difficult for the fraud detection server to detect the fraudulent vehicle. Also, even if the fraud detection server detects the fraudulent vehicle, it is difficult to accurately determine what kind of influence is actually caused by the falsified frame. Accordingly, there is a problem in that the fraud detection server cannot determine whether the influence is good or bad, or cannot appropriately handle the influence according to the magnitude of the influence.

To address the problem described above, the present invention provides a vehicle monitoring apparatus and the like with which even if a frame uploaded by a fraudulent vehicle is falsified, it is possible to assist in detecting the fraudulent vehicle.

A vehicle monitoring apparatus according to one aspect of the present disclosure includes: a first communicator that receives specifying information for specifying a target vehicle from a server; a processor; and a memory storing at least one set of instructions that, when executed by the processor causes the processor to perform operations including: acquiring driving information from the target vehicle, the driving information being information regarding driving of the target vehicle specified by the specifying information received by the first communicator. The first communicator transmits the driving information acquired to the server.

Generic or specific aspects thereof may be implemented by a system, a method, an integrated circuit, a computer program or a computer readable recording medium such as a CD-ROM, or may be implemented by any combination of a system, a method, an integrated circuit, a computer program and a recording medium.

With the vehicle monitoring apparatus according to the present disclosure, even if a frame uploaded by a fraudulent vehicle is falsified, it is possible to assist in detecting the fraudulent vehicle.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 15 is a diagram showing conditions for determining priority based on a monitoring log according to the embodiment;

FIG. 17 is a diagram showing an example of a vehicle and monitoring logs according to the embodiment;

DETAILED DESCRIPTION OF THE EMBODIMENT

Figure 1:
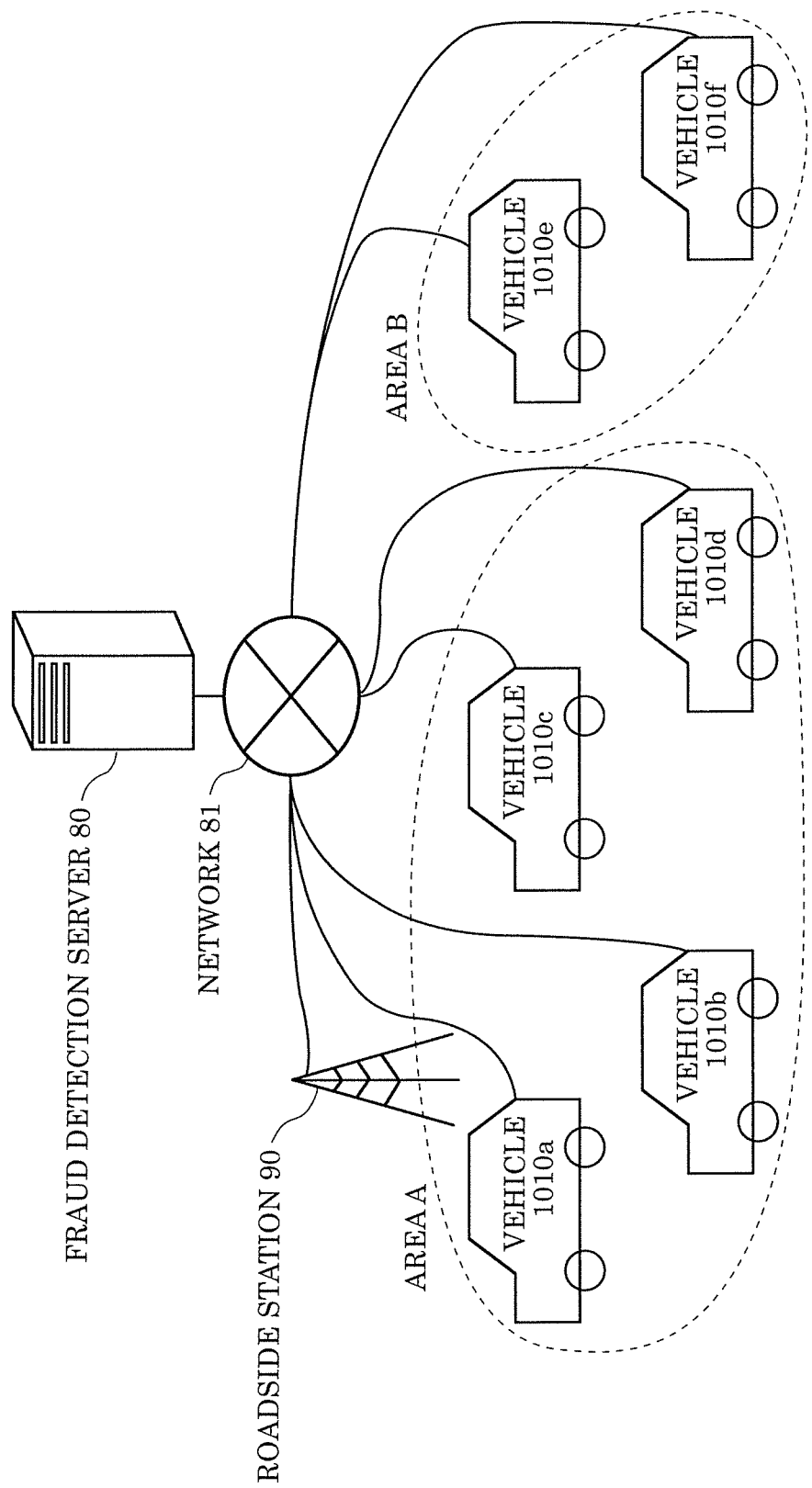
FIG. 1 is a diagram showing an overall configuration of a vehicle-mounted network monitoring system according to an embodiment.

A vehicle monitoring apparatus according to one aspect of the present disclosure includes: a first communicator that receives specifying information for specifying a target vehicle from a server; a processor; and a memory storing at least one set of instructions that, when executed by the processor causes the processor to perform operations including: acquiring driving information from the target vehicle, the driving information being information regarding driving of the target vehicle specified by the specifying information received by the first communicator. The first communicator transmits the driving information acquired to the server.

For example, in the acquiring, the driving information obtained from the target vehicle through communication may be obtained.

For example, in the acquiring, the driving information obtained by sensing the target vehicle may be obtained.

For example, in the acquiring, the driving information obtained by sensing the target vehicle may be obtained.

For example, the operations may further include: determining whether or not first driving information that is the driving information obtained through the communication and second driving information that is the driving information obtained by the sensing match, and the first communicator may transmit the first driving information and the second driving information to the server only when it is determined in the determining that the first driving information and the second driving information do not match.

For example, the vehicle monitoring apparatus may be provided in a vehicle, and in the acquiring, it may be presented, to a driver of the vehicle, question information for asking a driving state of the target vehicle, and the driving information based on answer information to the question information acquired from the driver by sensing may be acquired.

For example, the driving information of the target vehicle may include speed information that indicates a speed of the target vehicle.

A fraud detection server according to one aspect of the present disclosure includes: a first communicator that receives first driving information that is information regarding driving of a target vehicle; a second communicator that receives the second driving information from the vehicle monitoring apparatus of the one or more vehicles; a memory that stores position information that indicates current positions of a plurality of vehicles; a processor; and the memory storing at least one set of instructions that, when executed by the processor causes the processor to perform operations including: when an anomaly is detected in the first driving information received from the target vehicle, specifying one or more vehicles that are present within a predetermined distance from the target vehicle from among the plurality of vehicles by referencing the position information, and transmitting a notification requesting for second driving information regarding driving of the target vehicle to a vehicle monitoring apparatus of each of the one or more vehicles specified; and determining priority based on the first driving information and the second driving information, the priority indicating a degree of precedence in which the anomaly needs to be preferentially analyzed, and more preferentially transmitting a notification of the anomaly as the anomaly has higher priority.

For example, when it is determined that the first driving information and the second driving information do not match, higher priority may be given in the notification to the anomaly detected in the first driving information.

A control method for controlling a vehicle monitoring apparatus according to one aspect of the present disclosure includes: receiving specifying information for specifying a target vehicle from a server; acquiring driving information from the target vehicle, the driving information being information regarding driving of the target vehicle specified by the specifying information received; and transmitting the driving information acquired to the server.

A control method for controlling a fraud detection server according to one aspect of the present disclosure includes: receiving first driving information that is information regarding driving of a target vehicle; storing position information that indicates current positions of a plurality of vehicles; when an anomaly is detected in the first driving information received from the target vehicle, specifying one or more vehicles that are present within a predetermined distance from the target vehicle from among the plurality of vehicles by referencing the position information, and transmitting a notification requesting for second driving information regarding driving of the target vehicle to a vehicle monitoring apparatus of each of the one or more vehicles specified; receiving the second driving information from the vehicle monitoring apparatus of the one or more vehicles; and determining priority based on the first driving information and the second driving information, the priority indicating a degree of precedence in which the anomaly needs to be preferentially analyzed, and more preferentially transmitting a notification of the anomaly as the anomaly has higher priority.

According to the aspect described above, the vehicle monitoring apparatus acquires, from the target vehicle specified by the specifying information obtained from the server, the driving information of the target vehicle, and transmits the acquired driving information to the server. Accordingly, even if a frame uploaded to the server from the target vehicle is falsified, with the driving information of the target vehicle transmitted to the server from the vehicle monitoring apparatus, the server can detect the fraud of the target vehicle. Thus, even if a frame uploaded by a fraudulent vehicle is falsified, the vehicle monitoring apparatus can assist in detecting the fraudulent vehicle.

For example, the acquirer may acquire the driving information obtained from the target vehicle through communication.

According to the aspect described above, the vehicle monitoring apparatus acquires the driving information obtained through communication with the specified vehicle. Accordingly, even if a frame uploaded by a fraudulent vehicle is falsified, the vehicle monitoring apparatus can more easily obtain the driving information of the target vehicle and assist in detecting the fraudulent vehicle.

For example, the acquirer may acquire the driving information obtained by sensing the target vehicle.

According to the aspect described above, the vehicle monitoring apparatus acquires the driving information obtained by sensing the specified vehicle. Accordingly, even if a frame uploaded by a fraudulent vehicle is falsified, the vehicle monitoring apparatus can more easily obtain the driving information of the target vehicle and assist in detecting the fraudulent vehicle.

For example, the vehicle monitoring apparatus may further include a determiner that determines whether or not first driving information that is the driving information obtained through the communication and second driving information that is the driving information obtained by the sensing match, and the first communicator may transmit the first driving information and the second driving information to the server only when the determiner determines that the first driving information and the second driving information do not match.

According to the aspect described above, the vehicle monitoring apparatus transmits the driving information to the server only when the driving information of the target vehicle acquired through communication and the driving information of the target vehicle acquired by sensing do not match, and thus the amount of communication to the server is reduced. Accordingly, even if a frame uploaded by a fraudulent vehicle is falsified, the vehicle monitoring apparatus can assist in detecting the fraudulent vehicle while reducing the amount of communication to the server.

For example, the vehicle monitoring apparatus may be provided in a vehicle, and the acquirer may present, to a driver of the vehicle, question information for asking a driving state of the target vehicle, and acquire the driving information based on answer information to the question information acquired from the driver by sensing.

According to the aspect described above, the vehicle monitoring apparatus acquires a result of determination of the driver with respect to the driving state of the target vehicle by sensing. Accordingly, even if a frame uploaded by a fraudulent vehicle is falsified, the vehicle monitoring apparatus can assist in detecting the fraudulent vehicle by using the driving information of the target vehicle obtained from even more information sources.

For example, the driving information of the target vehicle may include speed information that indicates a speed of the target vehicle.

According to the aspect described above, the vehicle monitoring apparatus can detect, in particular, a fraud in the speed of the target vehicle. Accordingly, even if a frame in which particularly the vehicle speed has been falsified is uploaded by a fraudulent vehicle, the vehicle monitoring apparatus can assist in detecting the fraudulent vehicle.

A fraud detection server according to one aspect of the present disclosure includes: a first communicator that receives first driving information that is information regarding driving of a target vehicle; a storage that stores position information that indicates current positions of a plurality of vehicles; a second communicator that performs an operation (a) of, when an anomaly is detected in the first driving information received from the target vehicle, specifying one or more vehicles that are present within a predetermined distance from the target vehicle from among the plurality of vehicles by referencing the position information, and transmitting a notification requesting for second driving information regarding driving of the target vehicle to a vehicle monitoring apparatus of each of the one or more vehicles specified, and an operation (b) of receiving the second driving information from the vehicle monitoring apparatus of the one or more vehicles; and a notifier that determines priority based on the first driving information and the second driving information, the priority indicating a degree of precedence in which the anomaly needs to be preferentially analyzed, and more preferentially transmits a notification of the anomaly as the anomaly has higher priority.

According to the aspect described above, the fraud detection server causes each vehicle monitoring apparatus of the vehicles that are present within a predetermined distance from the target vehicle to acquire the driving state of the target vehicle. Accordingly, even if a frame uploaded to the server from the target vehicle is falsified, the server can detect the fraud of the target vehicle based on the driving information of the target vehicle transmitted to the server from the vehicle monitoring apparatus. Thus, even if a frame uploaded by a fraudulent vehicle is falsified, the fraud detection server can detect the fraudulent vehicle.

For example, when it is determined that the first driving information and the second driving information do not match, the notifier may give higher priority to the anomaly detected in the first driving information.

According to the aspect described above, when the driving information of the target vehicle acquired through communication and the driving information of the target vehicle acquired by sensing do not match, the fraud detection server more preferentially transmits a notification of the anomaly to an analyst or the like. Accordingly, when the driving information of the target vehicle acquired through communication and the driving information of the target vehicle acquired by sensing do not match, it is possible to cause the analyst or the like to more preferentially take necessary measures.

Also a control method for controlling a vehicle monitoring apparatus according to one aspect of the present disclosure includes: receiving specifying information for specifying a target vehicle from a server; acquiring driving information from the target vehicle, the driving information being information regarding driving of the target vehicle specified by the specifying information received; and transmitting the driving information acquired to the server. According to the aspect described above, the same effects as those of the vehicle monitoring apparatus described above are obtained.

Also, a control method for controlling a fraud detection server according to one aspect of the present disclosure includes: receiving first driving information that is information regarding driving of a target vehicle; storing position information that indicates current positions of a plurality of vehicles; when an anomaly is detected in the first driving information received from the target vehicle, specifying one or more vehicles that are present within a predetermined distance from the target vehicle from among the plurality of vehicles by referencing the position information, and transmitting a notification requesting for second driving information regarding driving of the target vehicle to a vehicle monitoring apparatus of each of the one or more vehicles specified; receiving the second driving information from the vehicle monitoring apparatus of the one or more vehicles; and determining priority based on the first driving information and the second driving information, the priority indicating a degree of precedence in which the anomaly needs to be preferentially analyzed, and more preferentially transmitting a notification of the anomaly as the anomaly has higher priority.

According to the aspect described above, the same effects as those of the fraud detection server described above are obtained.

Generic or specific aspects thereof may be implemented by a system, a method, an integrated circuit, a computer program or a computer readable recording medium such as a CD-ROM, or may be implemented by any combination of a system, a method, an integrated circuit, a computer program and a recording medium.

Hereinafter, an embodiment will be described specifically with reference to the drawings.

The embodiment given below shows a generic or specific example. The numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements.

Embodiment

Hereinafter, a description will be given of a fraudulent vehicle monitoring system that includes: a plurality of vehicles each including a vehicle-mounted network (vehicle-mounted network system) in which a plurality of electronic control units (ECUs) perform communication via a CAN bus; and a server (fraud detection server).

The fraudulent vehicle monitoring system includes a vehicle monitoring apparatus that, even if a frame uploaded by a fraudulent vehicle is falsified, can assist in detecting the fraudulent vehicle.

[1.1 Overall Configuration of Fraudulent Vehicle Monitoring System]

FIG. 1 is a diagram showing an overall configuration of a fraudulent vehicle monitoring system according to the present embodiment.

As shown in FIG. 1, the fraudulent vehicle monitoring system includes fraud detection server 80, roadside station 90, and vehicles 1010a, 1010b, 1010c, 1010d, 1010e, and 1010f that are connected via network 81 that serves as a communication path.

Network 81 may include an internet or dedicated communication line. Vehicles 1010a, 1010b, 1010c, 1010d, 1010e, and 1010f each include a vehicle-mounted network that is connected to various types of devices such as a control apparatus, a sensor, an actuator, and a user interface apparatus that are provided in the vehicle, and in which a plurality of ECUs that perform communication via an in-vehicle bus (CAN bus) are included.

In the vehicle-mounted network provided in each vehicle, the ECUs perform communication in accordance with the CAN protocol. Frames according to the CAN protocol include a data frame, a remote frame, an overload frame, and an error frame. Here, a description will be given focusing mainly on the data frame. In the CAN, the data frame is defined to include an ID field for storing an ID, a data length code (DLC) that indicates a data length, and a data field for storing data.

Roadside station 90, and vehicles 1010a, 1010b, 1010c, and 1010d are present in area A. As used herein, the expression "they are present in the same area" means that they are present in a communicable range where they can perform V2X (Vehicle-to-Everything) communication with each other.

Vehicles 1010e and 1010f are present in area B.

[1.2 Overall Configuration of Vehicle-Mounted Network System]

Figure 2:
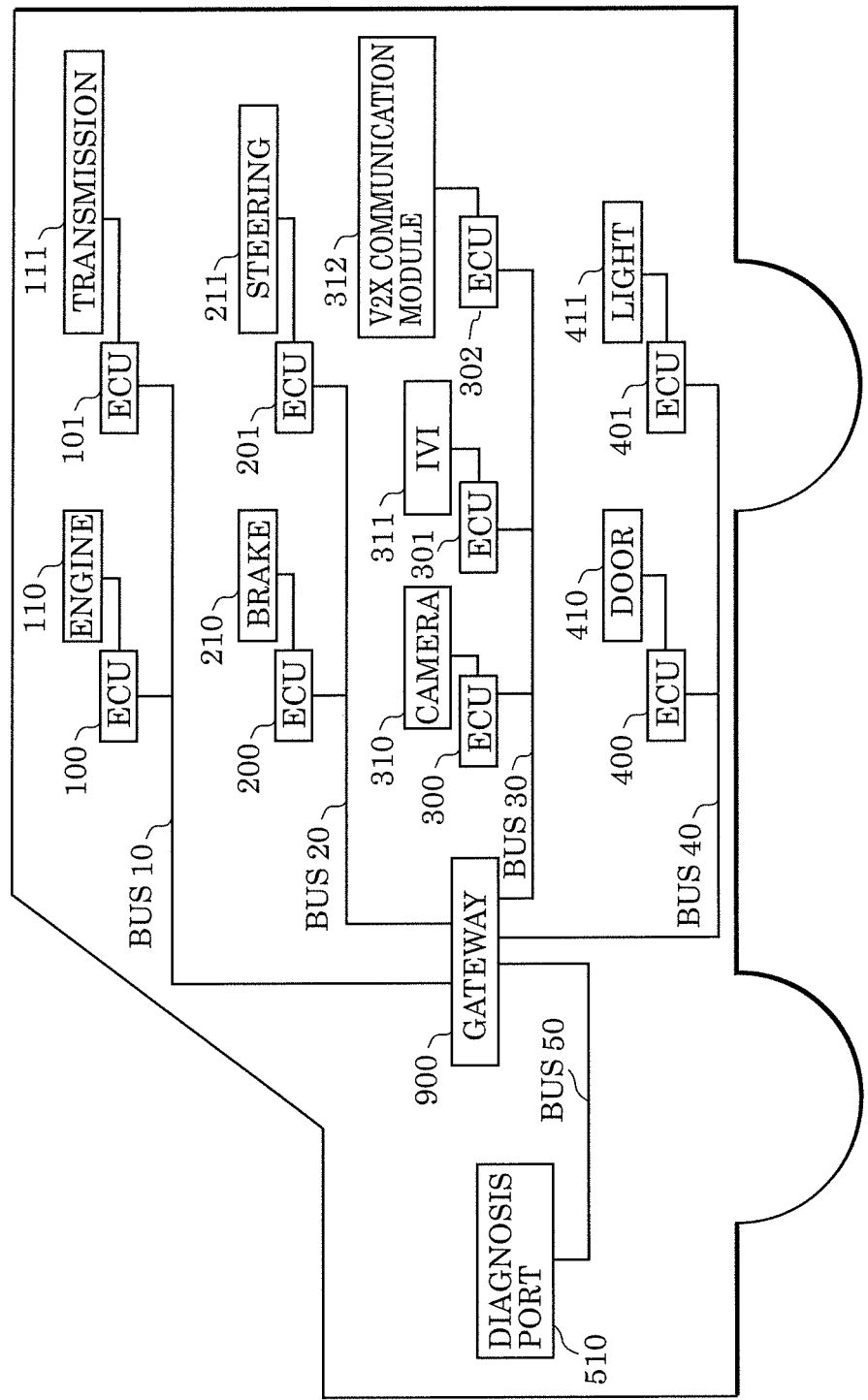
FIG. 2 is a diagram showing an overall configuration of a vehicle-mounted network system according to the embodiment.

FIG. 2 is a diagram showing an example of a configuration of a vehicle-mounted network system provided in vehicle 1010a that is a model A vehicle. Other model vehicles have a configuration that is the same as or similar to the configuration shown in FIG. 2, or a configuration that is partially different from the configuration shown in FIG. 2.

The vehicle-mounted network system provided in vehicle 1010a or the like includes nodes such as a plurality of ECUs (ECUs 100, 101, 200, 201, 300, 301, 302, 400, and 401) and gateway 900 that are connected via buses (CAN buses) 10, 20, 30, 40, and 50. Gateway 900 is also deemed as an ECU. Although not shown in FIG. 2, the vehicle-mounted network system may include even more ECUs.

An ECU is an apparatus that includes, for example, a processor (microprocessor), a digital circuit such as a memory, an analog circuit, a communication circuit, and the like. The memory includes a ROM and a RAM, and a control program (computer program) executable by the processor can be stored. For example, by the processor performing operations in accordance with the control program, the ECU can implement various functions. The computer program is configured by combining a plurality of instruction codes for the processor in order to implement a predetermined function.

Bus 10 is connected to power-train ECUs including ECU (engine ECU) 100 and ECU (transmission ECU) 101 that are respectively connected to engine 110 and transmission 111, the power-train ECUs being ECUs that perform operations related to "driving" of the vehicle such as motor control, fuel control and battery control.

Bus 20 is connected to chassis ECUs including ECU (brake ECU) 200 and ECU (steering ECU) 201 that are respectively connected to brake 210 and steering 211, the chassis ECUs being ECUs that perform operations related to controlling the behaviors of the vehicle such as "turning" and "stopping".

Bus 30 is connected to information system-related ECUs including ECU 300, ECU 301, and ECU 302 that are respectively connected to camera 310, IVI (In-Vehicle Infotainment System) 311, and V2X communication module 312, the information system-related ECUs being ECUs that have functions of recognizing, determining and controlling a drive assist based on camera information or functions related to an audio head unit, or that are related to an information system such as V2X communication.

Bus 40 is connected to body-system related ECUs including ECU 400 and ECU 401 that are respectively connected to door 410 and light 411, the body-system related ECUs performing operations related to controlling vehicle equipment such as an air conditioner and direction indicators.

Bus 50 is connected to diagnosis port 510 that is an interface for performing communication with an external diagnosis tool (fault diagnosis tool) such as, for example, OBD 2 (On-Board Diagnostics 2).

Each ECU (ECU 100, 200, or the like) acquires the state of the device (engine 110, brake 210, or the like) that is connected thereto, and regularly transmits a frame that indicates the state of the device and the like to the vehicle-mounted network, or in other words, the CAN bus.

ECUs 100 and 101 that are connected to bus 10, ECUs 200 and 201 that are connected to bus 20, and ECUs 300, 301, and 302 that are connected to bus 30 are MAC compliant ECUs that are ECUs that have a MAC processing function of processing a message authentication code (MAC). The MAC processing function includes, specifically, a MAC generation function, a MAC verification function, and the like.

Also, ECUs 400 and 401 that are connected to bus 40 are MAC non-compliant ECUs that do not have a MAC processing function.

Gateway 900 is a MAC compliant ECU that has a MAC generation function and a MAC verification function.

Gateway 900 is an ECU that connects a plurality of different communication paths and transfers data between the communication paths. Gateway 900 is connected to bus 10, bus 20, bus 30, bus 40, and bus 50. That is, gateway 900 is a type of ECU that has a function of transferring a frame (data frame) received from one bus to another bus under predetermined conditions (or in other words, a transfer destination bus selected according to the conditions). Gateway 900 includes a communication apparatus (a communication circuit, and the like) for performing communication with fraud detection server 80 that is provided outside the vehicle. Gateway 900 has, for example, a function of transmitting (uploading) information regarding a frame received from each bus to fraud detection server 80. The configuration of gateway 900 will be described later in detail.

[1.3 Configuration of Fraud Detection Server]

Figure 3:
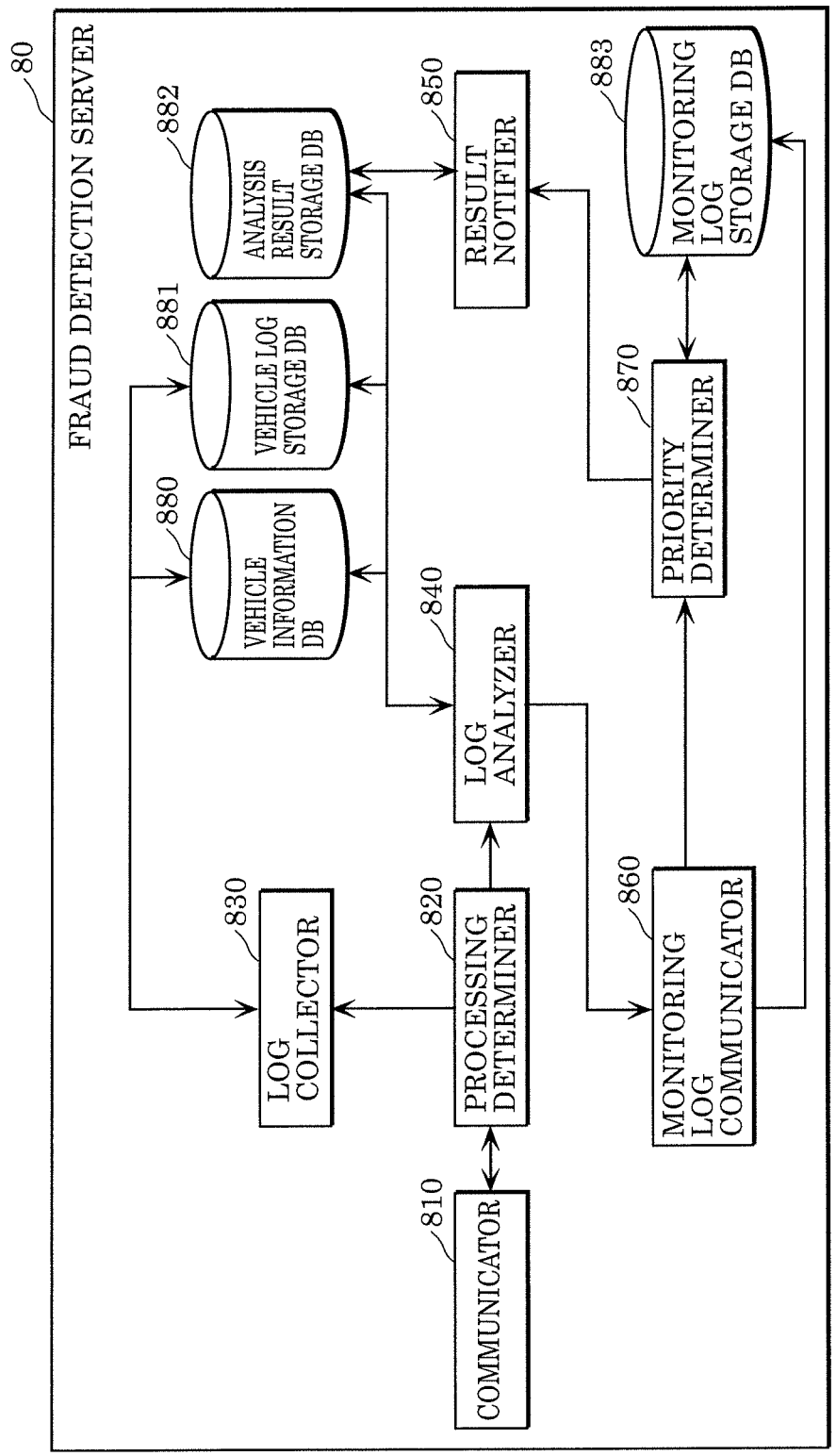
FIG. 3 is a diagram showing a configuration of a fraud detection server according to the embodiment.

FIG. 3 is a configuration diagram of fraud detection server 80. Fraud detection server 80 is a server for handling a fraudulent frame transmitted via the vehicle-mounted network provided in vehicle 1010a or the like. Fraud detection server 80 is implemented by a computer that includes, for example, a processor, a memory, a communication interface, and the like. Fraud detection server 80 includes communicator 810, processing determiner 820, log collector 830, log analyzer 840, result notifier 850, monitoring log communicator 860, priority determiner 870, vehicle information DB 880, vehicle log storage DB 881, analysis result storage DB 882, and monitoring log storage DB 883.

Vehicle information DB 880, vehicle log storage DB 881, analysis result storage DB 882, and monitoring log storage DB 883 may be implemented by, for example, a storage medium such as a memory or a hard disk.

Also, the functions of processing determiner 820, log collector 830, log analyzer 840, and priority determiner 870 are implemented by, for example, a control program stored in the memory being executed by the processor.

Communicator 810 is implemented by the communication interface, the processor that executes the control program stored in the memory, or the like.

Communicator 810 performs communication with vehicles 1010a, 1010b, 1010c, 1010d, 1010e, and 1010f via the network, and thereby receives information regarding the vehicle-mounted network of each vehicle. The information regarding each vehicle-mounted network may include, for example, information regarding the content of frames flowing through the CAN buses in the vehicle-mounted network, reception timing (interval, frequency, or the like), bus load factor, and the result of MAC verification of the frames.

Also, in addition to the information regarding each vehicle-mounted network, meta information that indicates the current state of the vehicle is also notified. The meta information may include information that indicates the current position of the vehicle, a BSM (Basic Safety Message), and weather. The position of the vehicle is, for example, a GPS position acquired by a GPS (Global Positioning System).

Processing determiner 820 determines processing to be performed on the information regarding each vehicle-mounted network transmitted from communicator 810.

Log collector 830 stores various types of data (information regarding frames received via each vehicle-mounted network, and the like), which are the content of log information collected from each vehicle, into vehicle log storage DB 881 based on the information stored in vehicle information DB 880.

Log collector 830 may perform predetermined processing such as normalization on the various types of data when storing the various types of data into vehicle log storage DB 881.

Log analyzer 840 has a function of analyzing the log information collected from each vehicle and stored in vehicle log storage DB 881 and determining whether or not a frame received by the vehicle-mounted network of a vehicle is fraudulent, or in other words, whether or not an attack frame has been transmitted to the vehicle-mounted network of the vehicle by an attacker.

Log analyzer 840 may perform, for example, statistical processing or the like on information regarding a plurality of frames collected from each vehicle indicated by the stored log information, more specifically, information regarding the content, reception timing, and the like of each of the plurality of frames.

Log analyzer 840 has a function of determining, based on information regarding a plurality of frames acquired by communicator 810 and information regarding a frame received by the vehicle-mounted network of a vehicle (for example, vehicle 1010a) and acquired by communicator 810 after the plurality of frames have been acquired, the anomaly level of the frame received by the vehicle-mounted network of the vehicle, or whether or not there is an anomaly in the received frame.

Log analyzer 840 may construct, for example, a predetermined model for a frame that flows through each vehicle-mounted network in a normal state, the predetermined model that can be used to compare with an anomalous state, and adjust (update) the predetermined model to make it more appropriate by using machine learning based on sequentially acquired log information.

In this case, log analyzer 840 may perform processing (for example, multivariate analysis or the like) on the information regarding a plurality of frames indicated by the collected log information as appropriate and supply the processed information to the learning of the predetermined model. As the learning of the predetermined model, either supervised learning or unsupervised learning may be used.

For example, in the case where the vehicle-mounted network system of each vehicle has a fraud detection function of detecting, based on a predetermined rule, that a frame (fraudulent frame) that does not comply with the rule flows through a CAN bus, the log information may include information that indicates whether or not the frame is a fraudulent frame, and log analyzer 840 may perform supervised learning on the predetermined model based on the information that indicates whether or not the frame is a fraudulent frame.

Also, log analyzer 840 may collect log information regarding frames that are not fraudulent frames from each vehicle or collect log information regarding all frames irrespective of whether they are fraudulent frames, and perform unsupervised learning on the predetermined model based on the collected log information.

The predetermined model is used to calculate the anomaly level (the degree of anomaly) of a frame received by the vehicle-mounted network of a vehicle. The content of the predetermined model is not limited as long as it can be used to calculate the anomaly level of the frame.

The anomaly level is calculated by, for example, comparison between information regarding the frame received by the vehicle-mounted network of a vehicle and a predetermined model (or in other words, computation processing using information regarding the frame and the predetermined model). Log analyzer 840 may construct, as the predetermined model for calculating the anomaly level, a predetermined model that indicates, for example, a distribution of feature values of a frame received by a vehicle-mounted network in a normal state, more specifically, feature vectors including components such as frame content, frame receipt interval, and frame receipt frequency, and the like, based on the log information of vehicles of the same vehicle model.

The predetermined model may be, for example, a model that indicates the relationship between a response variable and an explanatory variable, where the anomaly level is set as the response variable, and the log information is set as the explanatory variable. The anomaly level may, for example, take a value of 0 (zero) when it is determined that there is no anomaly (or in other words, it is normal), and take a positive numerical value according to the degree of anomaly when it is determined that there is an anomaly. The anomaly level may take two values of 0 (for example, when it is determined that there is no anomaly) and 1 (for example, when it is determined that there is an anomaly), or may take three values or more according to a plurality of degrees of anomaly.

A configuration is also possible in which it is determined that there is an anomaly if the anomaly level exceeds a predetermined threshold value. For example, the anomaly level of a frame received by the vehicle-mounted network of a vehicle can be calculated by determining whether or not a feature value of the frame is within a range defined by threshold values determined by multiplying a standard deviation of a distribution (for example, a normal distribution specified by average value and dispersion) of a feature value indicated by a predetermined model determined based on the already collected log information by a predetermined coefficient (for example, 3). Also, a plurality of anomaly levels can be calculated by using a plurality of predetermined coefficients. As the method used to construct a predetermined model for calculating the anomaly level, a method such as outlier detection or change point detection that detects an abrupt change in chronological order may be used.

As described above, log analyzer 840 calculates, based on information regarding a plurality of frames received by the vehicle-mounted network of each vehicle indicated by the collected log information (vehicle log information), the anomaly level of a frame received by the vehicle-mounted network of a vehicle after the plurality of frames have been received. Information regarding the frame received by the vehicle-mounted network of a vehicle can also be obtained from the log information of the vehicle.

If it is determined, based on the anomaly level calculated for the frame received by the vehicle-mounted network of a vehicle, that there is an anomaly, in order to check the influence of the anomalous frame, log analyzer 840 notifies monitoring log communicator 860 so as to transmit a monitoring request to vehicles that are present in the same area as the vehicle that transmitted the frame determined as having an anomaly.

Log analyzer 840 sequentially performs various types of analysis processing operations such as statistical processing based on the collected log information, updating (learning) the predetermined model, and calculating the anomaly level of the frame received by the vehicle-mounted network of a vehicle. Then, log analyzer 840 stores the results of the analysis processing operations (for example, information that indicates the updated predetermined model, information regarding the calculated anomaly level, and the like) in analysis result storage DB 882, and uses the results in the subsequent analysis processing (calculation of the anomaly level of a frame, or the like).

Log analyzer 840 may detect not only an anomaly as described above, but also an anomalous behavior, such as, for example, whether or not sudden steering, sudden braking, sudden acceleration or emergency braking has been performed, as the driving state of the vehicle.

Result notifier 850 includes a means that, if priority determiner 870 determines that there is a fraudulent event that needs to be notified to the administrator of the fraudulent vehicle monitoring system, transmits information regarding the fraudulent event stored in analysis result storage DB 882 to the administrator of the fraudulent vehicle monitoring system.

For example, result notifier 850 is connected to a display, and displays, on the display, information indicating that a fraudulent event has occurred. Also, result notifier 850 may function as a web server, or may visually reproduce the state of the surroundings of the vehicle in VR (Virtual Reality), by using a moving image obtained by recording information of the surroundings of the vehicle stored in monitoring log storage DB 883 and the vehicle logs stored in vehicle log storage DB 881, so as to notify the analyst of the state of the site, or may function as an email server so as to send a notification to the administrator via email.

The notification destination is not necessarily the administrator of the vehicle-mounted network monitoring system. For example, the notification may be sent to a security analyst of a security operation center to which vehicle-mounted network monitoring business is outsourced.

Upon receiving a notification indicating that an anomaly has been detected from log analyzer 840, monitoring log communicator 860 transmits a message (monitoring request notification) requesting to monitor the vehicle in which the anomaly has been detected to a vehicle or roadside station that is present in the same area as the vehicle in which the anomaly has been detected. The vehicle or roadside station that is present in the same area as the vehicle in which the anomaly has been detected is selected from GPS information or the like stored in vehicle log storage DB 881.

Also, monitoring log communicator 860 waits for a monitoring log to be received from the vehicle to which the above-described message (monitoring request notification) has been transmitted. Upon receiving a monitoring log, monitoring log communicator 860 stores the received monitoring log in monitoring log storage DB 883. Furthermore, monitoring log communicator 860 transmits an instruction to calculate the priority of the detected anomaly to priority determiner 870. The monitoring request notification may include license plate information, VIN (Vehicle Identification Number), or the like of the target vehicle that needs to be monitored. With this configuration, the vehicle or roadside station that has received the monitoring request notification can intensively monitor the target vehicle that needs to be monitored, and thus can acquire more detailed monitoring data. Alternatively, instead of including the license plate information, VIN, or the like of the target vehicle that needs to be monitored, simply, an instruction to monitor the surroundings may be transmitted. By doing so, it is possible to perform processing in consideration of the private information of the vehicle. In this case, by fraud detection server 80 that knows the positional relationship between vehicles performing moving image processing, the driving data (for example, driving speed, steering angle, and the like) of the target vehicle to be monitored can be extracted.

Priority determiner 870 checks the degree of the detected anomaly based on monitoring log storage DB 883, calculates the priority according to the degree of the anomaly, and transmits the calculated priority to result notifier 850. As used herein, the term "priority" refers to the degree of precedence in which the anomaly needs to be handled preferentially.

Priority determiner 870 calculates a relatively high priority when dangerous driving that can cause an accident such as sudden steering, sudden braking, sudden deceleration, or unsteady driving is performed, or when an accident has already taken place.

Also, priority determiner 870 calculates a medium priority when the presence of the vehicle determined as having an anomaly cannot be confirmed from the monitoring log, or when the vehicle log and the monitoring log do not match. This is because, in this case, it is not possible to confirm the state because the position information or the like included in the log may be falsified.

Also, priority determiner 870 calculates a relatively low priority when, as a result of monitoring the vehicle determined as having an anomaly, it is determined that there is no anomaly. This is because, in this case, the risk of immediately causing danger is low.

As the method for checking the degree of the detected anomaly, for example, a method may be used in which the state of the target vehicle to be monitored is obtained based on airbag activation information, emergency braking activation information, acceleration, steering information, speed, and the like included in a V2X communication log. Alternatively, as the method for checking the degree of the detected anomaly, a method may be used in which the driving state of the vehicle is recognized by analyzing a moving image or image information, and the influence on the driving of the vehicle is thereby recognized, or a method may be used in which the place where an accident has taken place is recognized. Furthermore, as the method for checking the degree of the detected anomaly, in the case where a driver's report is voice information or text information, a method may be used in which the state of the anomalous vehicle is obtained by text analysis or voice recognition.

Also, priority determiner 870 does not need to determine priority based only on monitoring logs. For example, whether monitoring logs match may be verified by using the vehicle log of the vehicle in which the anomaly has been detected and the vehicle log of a vehicle that has transmitted a monitoring log. For example, priority determiner 870 may calculate the speed or steering angle of the vehicle from a camera image included in the monitoring log, compare the calculated speed or steering angle with the speed or steering angle included in the vehicle log of the vehicle in which the anomaly has been detected, and determine that they do not match if the difference is greater than a predetermined value. With this configuration, priority determiner 870 can verify whether the vehicle logs and monitoring logs of a plurality of vehicles match, and a log having the lowest matching level can be determined as a falsified log.

Communicator 810 corresponds to a first communicator that receives first driving information that is information regarding driving of a vehicle.

Vehicle log storage DB 881 corresponds to a storage that stores position information that indicates current positions of a plurality of vehicles. The storage may be implemented by a storage device or the like.

Monitoring log communicator 860 corresponds to a second communicator that performs: an operation (a) of, when an anomaly is detected in the first driving information received from the target vehicle, specifying one or more vehicles that are present within a predetermined distance from the target vehicle from among the plurality of vehicles by referencing the position information, and transmitting a notification requesting for second driving information regarding driving of the target vehicle to a vehicle monitoring apparatus of each of the one or more vehicles specified, and an operation (b) of receiving the second driving information from the vehicle monitoring apparatus of the one or more vehicles.

Priority determiner 870 and result notifier 850 correspond to a notifier that determines priority based on the first driving information and the second driving information, the priority indicating the degree of precedence in which the anomaly needs to be preferentially analyzed, and more preferentially transmits a notification of the anomaly as the anomaly has higher priority.

If it is determined that the first driving information and the second driving information do not match, priority determiner 870 may give higher priority to the anomaly detected in the first driving information.

[1.4 Configuration of Gateway]

Figure 4A:
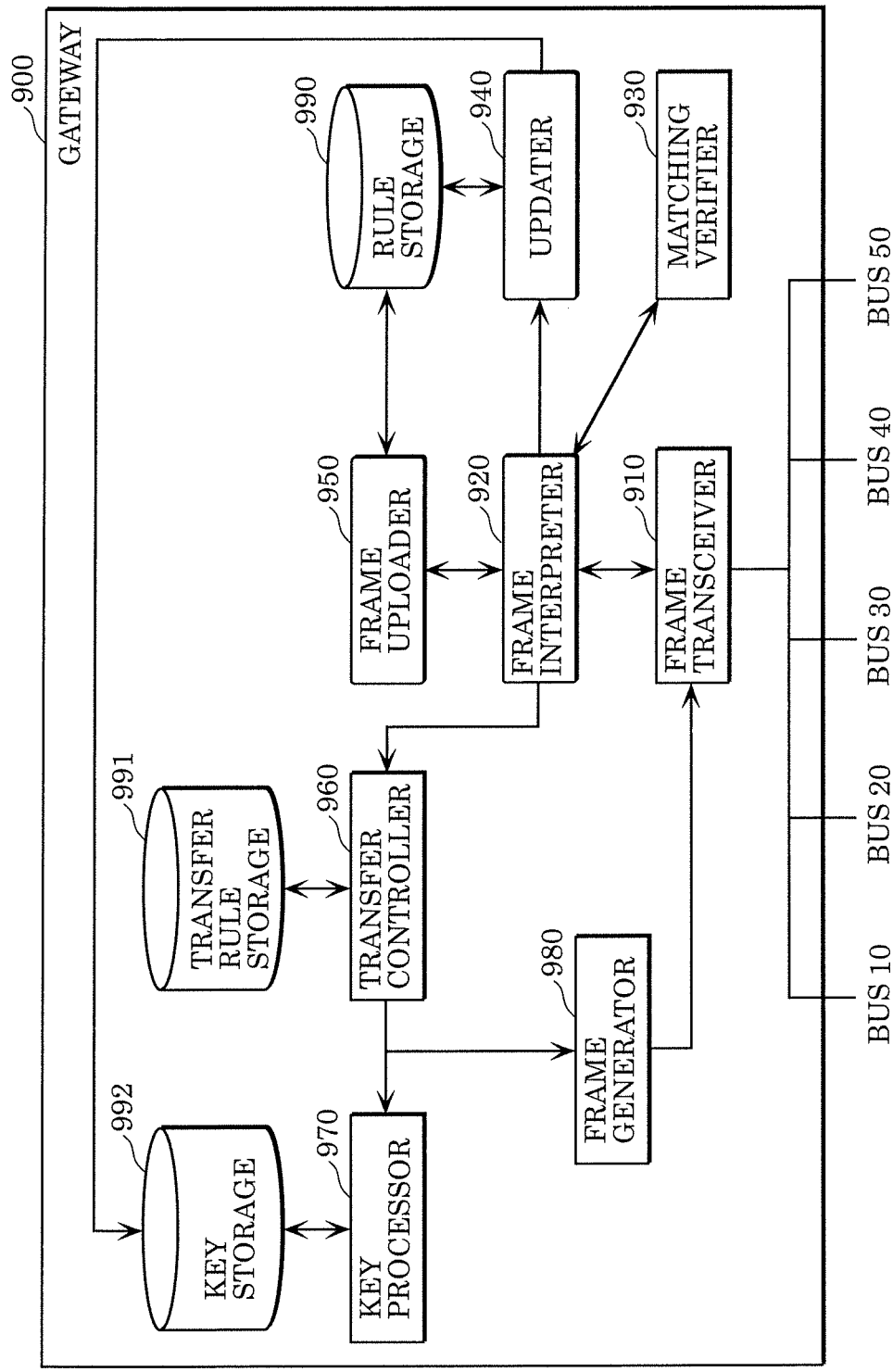
FIG. 4A is a diagram showing a configuration of a gateway according to the embodiment.

FIG. 4A shows a configuration of gateway 900 provided in the vehicle-mounted network of a vehicle (for example, vehicle 1010a). Gateway 900 is an example of a vehicle monitoring apparatus.

As shown in FIG. 4A, gateway 900 includes frame transceiver 910, frame interpreter 920, matching verifier 930, updater 940, frame uploader 950, transfer controller 960, key processor 970, frame generator 980, rule storage 990, transfer rule storage 991, and key storage 992.

The functions of the structural elements are implemented by, for example, the communication circuit in gateway 900, or a processor a digital circuit or the like that executes a control program stored in a memory. For example, frame uploader 950 and updater 940 are implemented by a communication circuit or the like for performing communication with fraud detection server 80.

Frame transceiver 910 transmits and receives frames that conform to the CAN protocol to and from bus 10, bus 20, bus 30, bus 40, and bus 50. Frame transceiver 910 receives frames from the buses on a bit-by-bit basis, and transmits the frames to frame interpreter 920.

Also, frame transceiver 910 transmits, based on bus information that indicates a transfer destination bus and a transmission frame notified from frame generator 980, the content of the frame on a bit-by-bit basis to one of bus 10, bus 20, bus 30, bus 40, and bus 50 that is the transfer destination.

Frame interpreter 920 receives a frame value from frame transceiver 910, and performs interpretation so as to perform mapping in each field in the frame format specified by the CAN protocol. Frame interpreter 920 transmits information regarding each field of the received frame to matching verifier 930.

If it is determined that the received frame does not conform to the CAN protocol, frame interpreter 920 transmits a request for an error frame to frame generator 980.

If an error frame is received, or in other words, if it is interpreted from the received frame value that the frame is an error frame, frame interpreter 920 discards the frame, or in other words, stops interpretation of the error frame.

Matching verifier 930 verifies whether the driving state of its own vehicle, the vehicle state of another vehicle recognized by sensing (which will be referred to as "sensing vehicle state"), and the vehicle state of the other vehicle notified from the other vehicle and received through V2X communication (which will be referred to as "V2X vehicle state") which are included in the frame match. The other vehicle may be specified by a monitoring request notification received from monitoring log communicator 860 of fraud detection server 80 via IVI 311. Alternatively, the other vehicle may be specified arbitrarily from the vehicles that are present in the same area as its own vehicle.

For example, a situation may occur in which the V2X vehicle state indicates that the driving speed of the other vehicle is 20 km/h whereas the sensing vehicle state indicates that the driving speed of the other vehicle is 60 km/h. As described above, if a difference larger than a predetermined value is detected with respect to the driving speed of the other vehicle, matching verifier 930 determines that the sensing vehicle state and the V2X vehicle state do not match, and transmits fraudulent vehicle information to fraud detection server 80.

The sensing vehicle state may be acquired from data obtained directly from a sensor, for example, a camera (drive recorder), a millimeter wave radar, a LIDAR (Light Detection and Ranging) system, or the like provided in the vehicle, or may be acquired from information obtained through CAN or the like. Furthermore, the sensing vehicle state may be acquired by combining the value of the sensor with the vehicle state of its own vehicle. For example, the sensing vehicle state may be acquired by processing the sensor value of the millimeter wave radar, thereby calculating a relative speed with respect to a vehicle ahead, and adding the driving speed of its own vehicle to the calculated relative speed to obtain the vehicle speed of the other vehicle. Alternatively, the sensing vehicle state may be acquired by performing image processing on an image obtained by the camera attached to the vehicle, and thereby calculating the behavior of the vehicle such as vehicle speed, whether or not a steering operation is being performed, or whether acceleration or deceleration is being performed.

Also, the method for verifying whether the vehicle states match is not limited to that described above. For example, when a vehicle ahead is the target vehicle to be monitored, matching verifier 930 may verify whether the vehicle states match by calculating the correlation between chronological variation in the V2X vehicle state notified from the vehicle ahead and chronological variation in the vehicle state of its own vehicle. More specifically, matching verifier 930 calculates the self-correlation between chronological data on the vehicle speed of its own vehicle acquired from the vehicle state of its own vehicle and chronological data on the vehicle speed acquired from the V2X vehicle state of the other vehicle, and determines that they do not match if they are significantly different. With this configuration, matching verifier 930 can detect that the V2X vehicle state notified from the vehicle ahead to its own vehicle is significantly different from the vehicle state of its own vehicle even if its own vehicle and the vehicle ahead are driving on the same road and thus exhibit substantially the same driving behavior. As a result, gateway 900 can detect that either the V2X vehicle state or the vehicle state of its own vehicle has been falsified, and thus safety is enhanced.

Updater 940 updates the priority rule stored in rule storage 990 based on information acquired from fraud detection server 80.

Frame uploader 950 sequentially acquires a frame received via any one of the CAN buses and transmitted from frame interpreter 920, and transmits (uploads) log information including information (for example, frame content, frame receipt interval, frame receipt frequency, and the like) regarding the received frame to fraud detection server 80.

At this time, in addition to the log information, meta information is uploaded. The meta information may include other various types of information (vehicle state information, basic safety message, vehicle position information, and bus load factor).

Furthermore, frame uploader 950 adds vehicle identification information (vehicle ID) to the log information. Frame uploader 950 may perform processing on the frame content, the frame receipt interval, the frame receipt frequency, or the like so that it can be treated as information regarding the received frame when fraud detection server 80 performs statistical processing, machine learning, or the like.

As used herein, the frame receipt interval refers to the difference between, for example, the time at which a frame was received and the time at which a frame having the same ID as the frame was received previously.

Also, the frame receipt frequency refers to, for example, the number of received frames having the same ID as the frame during a predetermined unit time. The processing involves, for example, extracting a feature value from features including the frame content, the frame receipt interval, the frame receipt frequency, and the like, performing normalization or the like, and contracting the amount of information of the feature value. The contraction of the amount of information of the feature value may be implemented by, for example, expressing the feature value by using feature vectors as each component, and using a dimensionality reduction algorithm such as principal component analysis of the dimensionality of the feature vectors based on information obtained in cooperation with fraud detection server 80.

If information regarding a frame received from a CAN bus is quickly transmitted to fraud detection server 80, fraud detection server 80 can quickly detect whether or not the frame is anomalous and handle the frame.

Also, frame uploader 950 may, for example, compress the log information and transmit the compressed log information to fraud detection server 80 unconditionally or according to the communication status in order to reduce the volume of traffic with fraud detection server 80. Also, frame uploader 950 may add, to the log information, instead of the information regarding all of the frames received from the CAN buses by frame transceiver 910, information regarding the frames of a specific ID or a plurality of IDs, and transmit the log information.

In response to a notification from fraud detection server 80, gateway 900 transmits information required by a predetermined ECU via a CAN bus, and thereby performs functions such as updating firmware, invalidating the drive assisting function, and performing remote control.

Transfer controller 960 selects a transfer destination bus based on the ID of the received frame and the transfer source bus (or in other words, the bus that received the frame) in accordance with the transfer rule stored in transfer rule storage 991, and transmits bus information that indicates the transfer destination bus and the content of the frame that needs to be transferred (for example, ID, DLC, data, and the like transmitted from frame interpreter 920) to frame generator 980 so as to request transmission of the frame.

Frame generator 980 constructs a transmission frame by using the content of the frame notified from transfer controller 960 according to the transmission request from transfer controller 960, and transmits the transmission frame and the bus information (for example, the identifier of the transfer destination bus, or the like) to frame transceiver 910.

Transfer rule storage 991 stores transfer rule information that indicates the rule for frame transfer to each bus. The transfer rule information indicates the ID of a frame that was received from a transfer source bus and needs to be transferred and a transfer destination bus.

Also, the transfer rule information includes information that indicates whether or not the bus is a bus specified to encrypt the frame content and information that indicates whether or not the bus is a bus specified to append a MAC to the frame. By referencing the information, in the case where the transfer source supports encryption, transfer controller 960 causes key processor 970 to decrypt the frame content by using an encryption key stored in key storage 992 and shared between the ECUs that are connected to the transfer source bus.

In the case where the transfer destination supports encryption, transfer controller 960 controls key processor 970 to encrypt and transfer the frame content by using the encryption key stored in key storage 992 and shared between the ECUs that are connected to the transfer destination bus.

Key processor 970 may use any method to perform each of encryption and decryption of the frame content and generation and verification of a MAC based on the frame content.

The MAC may be generated based on, for example, a value within a data field of the frame, or based on a combination of the value and a value within another field or other information (for example, a counter value obtained by counting the number of receptions of the frame, or the like).

As the method for calculating a MAC, for example, an HMAC (Hash-based Message Authentication Code), a CMAC (Cipher-based Message Authentication Code), or the like can be used.

Frame uploader 950 corresponds to a first communicator that receives specifying information for specifying a target vehicle from fraud detection server 80 and transmits driving information acquired by frame transceiver 910 to fraud detection server 80.

Frame transceiver 910 corresponds to an acquirer that acquires driving information from the target vehicle, the driving information being information regarding driving of the target vehicle specified by the specifying information received by the first communicator.

For example, frame transceiver 910 may acquire the driving information acquired from the specified vehicle through communication performed by V2X communication module 312.

For example, frame transceiver 910 may acquire the driving information obtained by sensing the specified vehicle by using a sensor such as camera 310.

Also, matching verifier 930 corresponds to a determiner that determines whether or not first driving information that is the driving information obtained through communication performed by V2X communication module 312 and second driving information that is the driving information obtained by sensing the specified vehicle by using the sensor match. In this case, frame uploader 950 may transmit the first driving information and the second driving information to fraud detection server 80 only when the determiner determines that the first driving information and the second driving information do not match.

The driving information of the target vehicle may include speed information that indicates the speed of the target vehicle.

[1.5 Configuration of Roadside Station]

Figure 4B:
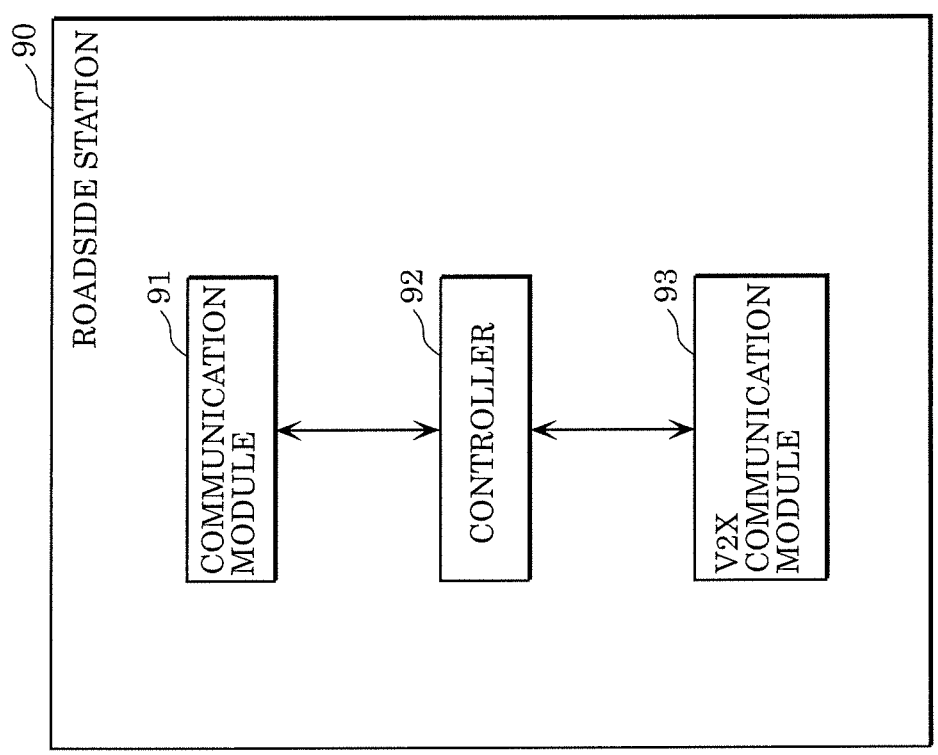
FIG. 4B is a diagram showing a configuration of a roadside station according to the embodiment.

FIG. 4B shows a configuration of roadside station 90. Roadside station 90 is an example of a vehicle monitoring apparatus.

As shown in FIG. 4B, roadside station 90 includes communication module 91, controller 92, and V2X communication module 93. Communication module 91 is a communication module that can communicate with fraud detection server 80. Communication module 91 receives specifying information for specifying a target vehicle from fraud detection server 80. Communication module 91 corresponds to a first communicator.

Controller 92 is a processor that acquires driving information from the target vehicle, the driving information being information regarding driving of the target vehicle specified by the specifying information received by communication module 91. Controller 92 corresponds to an acquirer.

V2X communication module 93 is a communication module that performs communication with a vehicle.

Roadside station 90 may further include a sensor such as a camera.

The processing operations performed by fraud detection server 80 and vehicle 1010b configured as described above will be described. Specifically, two examples of processing operations performed by fraud detection server 80, and two examples of processing operations performed by vehicle 1010b will be described. The following description will be given assuming that vehicle 1010a is a fraudulent vehicle. The processing performed by gateway 900 described below may be performed by roadside station 90.

(1) First Example of Processing by Fraud Detection Server 80

Figure 5:
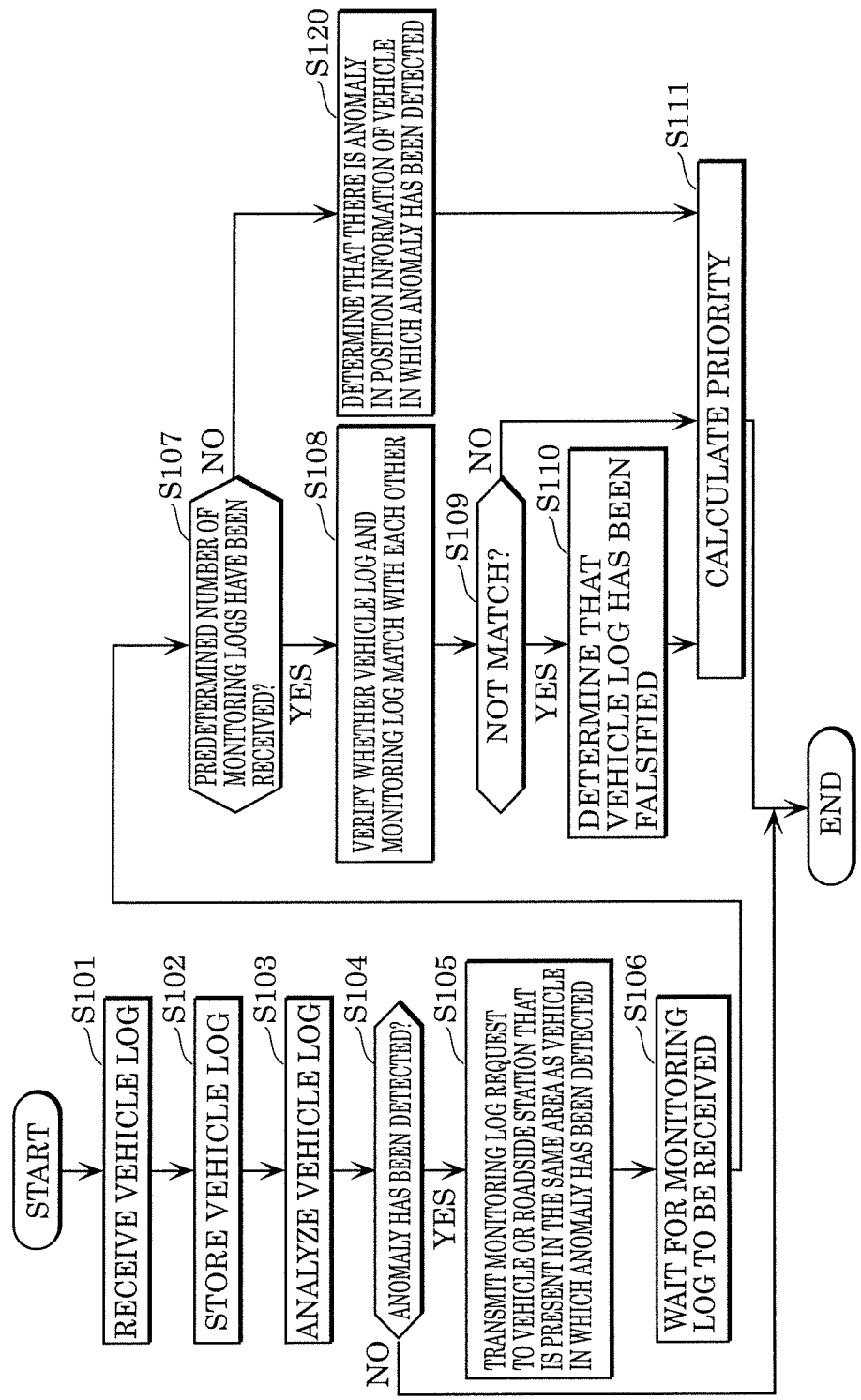
FIG. 5 is a first flowchart illustrating processing performed by the fraud detection server according to the embodiment.

FIG. 5 is a first flowchart illustrating processing performed by fraud detection server 80 according to the present embodiment.

In step S101, communicator 810 receives a vehicle log from vehicle 1010a. The received vehicle log is provided to log collector 830 via processing determiner 820.

In step S102, log collector 830 stores the vehicle log provided in step S101 in vehicle log storage DB 881.

In step S103, log analyzer 840 determines whether or not the frame received by the vehicle-mounted network is fraudulent by analyzing the vehicle log stored in vehicle log storage DB 881.

In step S104, log analyzer 840 determines whether or not it has been determined in step S103 that the frame is fraudulent, or in other words, determines whether an anomaly has been detected in the frame. If it is determined that an anomaly has been detected in the frame (Yes in step S104), the procedure advances to step S105. Otherwise (No in step S104), the set of processing operations shown in FIG. 5 ends.

In step S105, monitoring log communicator 860 transmits a message requesting to monitor the vehicle in which the anomaly has been detected to a vehicle(s) or a roadside station(s) that is present in the same area as the vehicle in which the anomaly has been detected in the frame in step S104.

In step S106, monitoring log communicator 860 waits for a monitoring log transmitted from the vehicle(s) or the roadside station(s) in response to the message transmitted in step S105 to be received. Upon receiving a monitoring log, the procedure advances to step S107.

In step S107, monitoring log communicator 860 determines whether or not a predetermined number of monitoring logs have been received from the vehicle(s) or the roadside station(s) in step S106. If it is determined that a number of monitoring logs that is greater than or equal to the predetermined number have been received (Yes in step S107), the procedure advances to step S108. Otherwise (No in step S107), the procedure advances to step S120.

In step S108, priority determiner 870 verifies whether the vehicle log and the monitoring logs match.

In step S109, priority determiner 870 checks whether or not the vehicle log and the monitoring logs do not match as a result of the verification performed in step S108. If it is determined that the vehicle log and the monitoring logs do not match (Yes in step S109), the procedure advances to step S110. Otherwise (No in step S109), the procedure advances to step S111.

In step S110, priority determiner 870 determines, based on the fact that the vehicle log and the monitoring logs do not match, that the vehicle log has been falsified.

In step S111, priority determiner 870 calculates priority that indicates the degree of precedence in which the anomaly detected in step S104 needs to be analyzed.

In step S120, priority determiner 870 determines that there is an anomaly in the position information of the vehicle in which the anomaly has been detected.

Through the set of processing operations shown in FIG. 5, fraud detection server 80 can detect a falsified vehicle log, or in other words, a fraud in the vehicle log.

(2) Second Example of Processing by Fraud Detection Server 80

Figure 6:
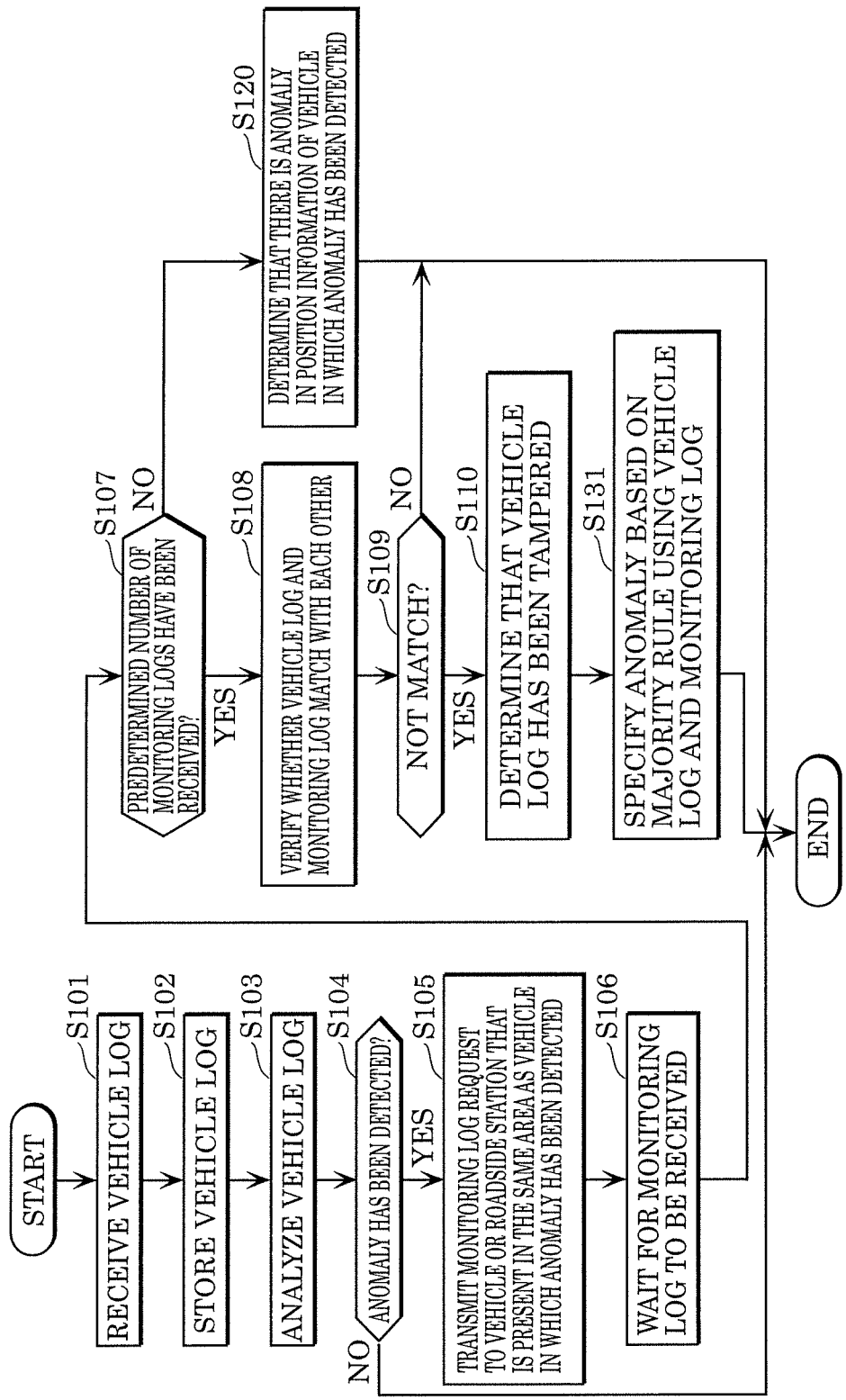
FIG. 6 is a second flowchart illustrating processing performed by the fraud detection server according to the embodiment.

FIG. 6 is a second flowchart illustrating processing performed by fraud detection server 80 according to the present embodiment. In FIG. 6, the processing operations from steps S101 to S110 and the processing operation in step S120 are the same as those shown in FIG. 5.

In step S131, priority determiner 870 specifies an anomaly based on the majority rule using the vehicle log and the monitoring logs.

Through the set of processing operations shown in FIG. 6, fraud detection server 80 can detect a falsified vehicle log, or in other words, a fraud in the vehicle log by using the monitoring logs from a plurality of vehicle monitoring apparatuses.

(3) First Example of Processing by Vehicle 1010*b*

Figure 7:
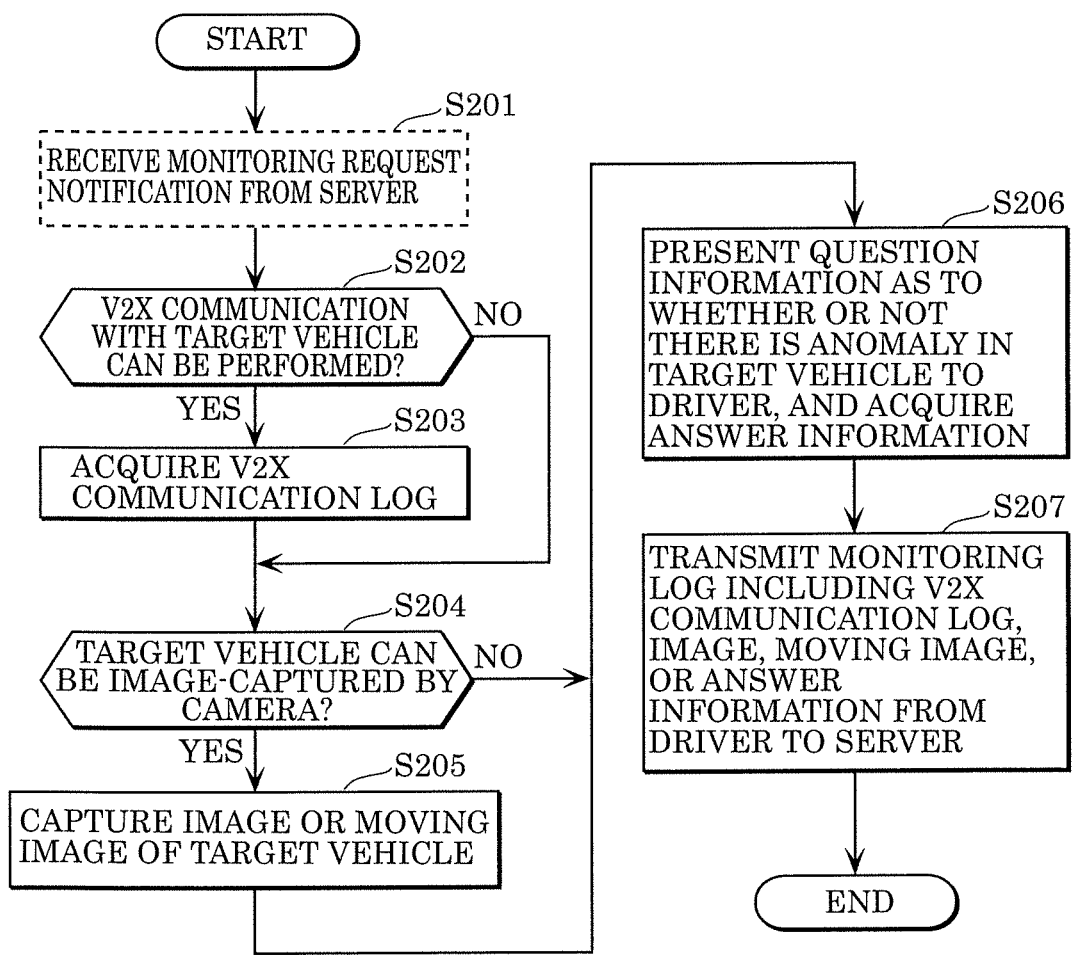
FIG. 7 is a first flowchart illustrating processing performed by the gateway according to the embodiment.

FIG. 7 is a first flowchart illustrating processing performed by gateway 900 according to the present embodiment.

In step S201, matching verifier 930 of vehicle 1010*b* receives a monitoring request notification transmitted from fraud detection server 80. The monitoring request notification has been transmitted as a result of fraud detection server 80 determining, for example, that vehicle 1010*a* is a fraudulent vehicle, and vehicle 1010*b* has been selected due to its presence in the same area as vehicle 1010*a*. Vehicle 1010*a* may also be referred to as the target vehicle.

In step S202, matching verifier 930 determines whether or not V2X communication module 312 can perform a communication connection with the target vehicle to be monitored (also referred to as a "target vehicle") specified by the monitoring request notification received in step S201. If it is determined that V2X communication module 312 can perform a communication connection with the target vehicle (Yes in step S202), the procedure advances to step S203. Otherwise, (No in step S202), the procedure advances to step S204.

In step S203, matching verifier 930 acquires a V2X communication log through communication performed by V2X communication module 312.

In step S204, matching verifier 930 determines whether or not the target vehicle can be image-captured by camera 310. A determination as to whether or not the target vehicle can be image-captured can be made by determining, for example, whether or not the target vehicle is present at a position where it can be image-captured by its own vehicle. A determination as to whether or not the target vehicle is present at a position where it can be image-captured may be made based on the position information of the target vehicle and that of its own vehicle, or may be made by determining whether or not the target vehicle is seen in an image captured by camera 310. If it is determined that the target vehicle can be image-captured by camera 310 (Yes in step S204), the procedure advances to step S205. Otherwise (No in step S204), the procedure advances to step S206.

In step S205, matching verifier 930 captures an image or a moving image of the target vehicle by using camera 310, and generates image data or moving image data.

In step S206, matching verifier 930 presents, to the driver, question information as to whether or not there is an anomaly in the target vehicle, and acquires answer information.

In step S207, matching verifier 930 transmits, to fraud detection server 80, a monitoring log including one or more selected from the V2X communication log acquired in step S203, the image data or the moving image data generated in step S205, and the answer information acquired from the driver in step S206.

Through the set of processing operations shown in FIG. 7, even if a frame uploaded by a fraudulent vehicle, or in other words, a target vehicle is falsified, vehicle 1010*b* can assist fraud detection server 80 in detecting the fraudulent vehicle.

(4) Second Example of Processing by Vehicle 1010*b*

Figure 8:
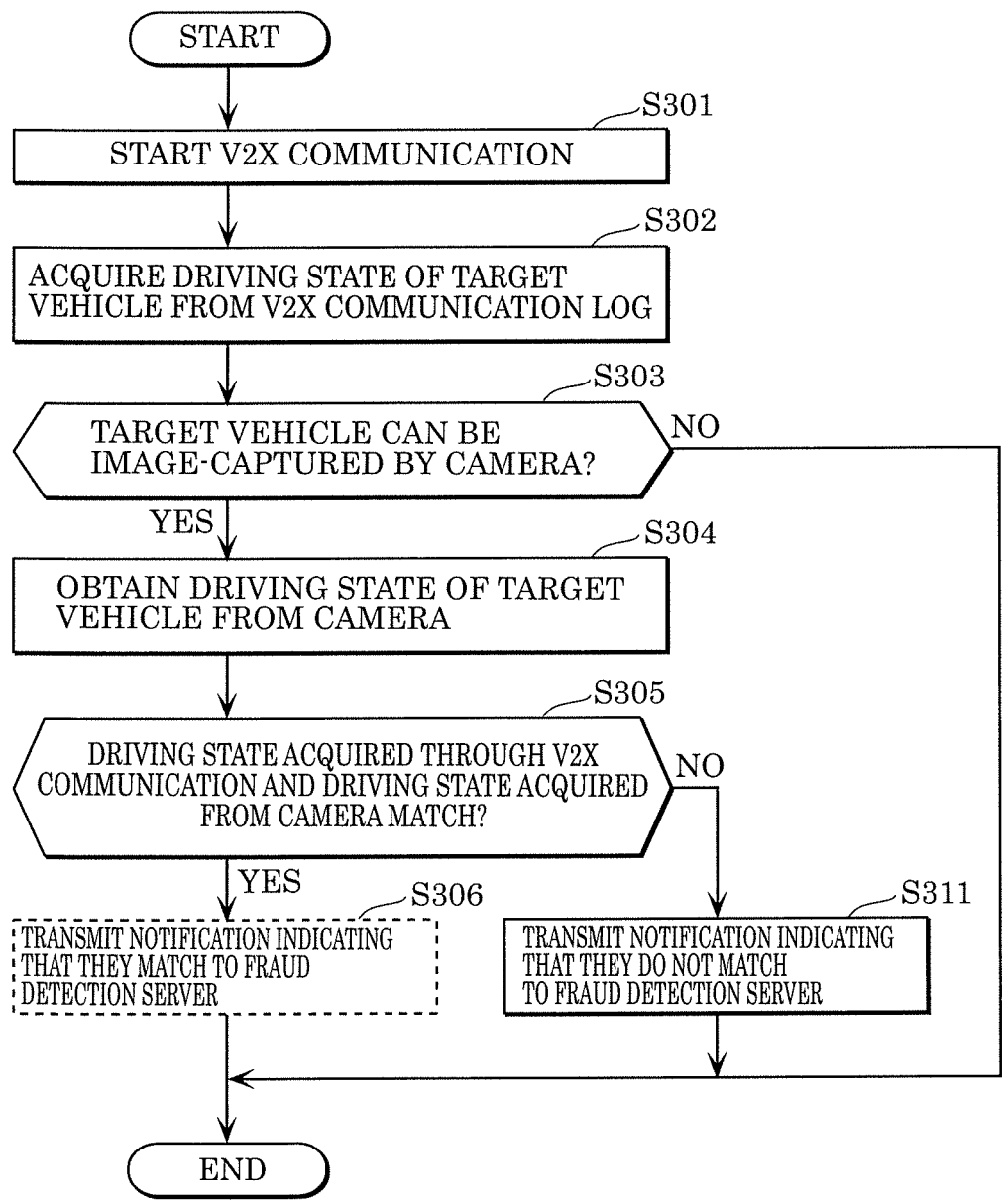
FIG. 8 is a second flowchart illustrating processing performed by the gateway according to the embodiment.

FIG. 8 is a second flowchart illustrating processing performed by gateway 900 according to the present embodiment.

In step S301, matching verifier 930 starts communication with a target vehicle by using V2X communication module 312. The target vehicle may be a target vehicle to be monitored that is specified by a monitoring request notification transmitted from fraud detection server 80, or may be an arbitrarily selected vehicle.

In step S302, matching verifier 930 acquires the driving state of the target vehicle through communication performed by V2X communication module 312.

In step S303, matching verifier 930 determines whether or not the target vehicle can be image-captured by camera 310. If it is determined that the target vehicle can be image-captured (Yes in step S303), the procedure advances to step S304. Otherwise (No in step S303), the set of processing operations shown in FIG. 8 ends.

In step S304, matching verifier 930 obtains the driving state of the target vehicle from camera 310.

In step S305, matching verifier 930 determines whether or not the driving state acquired through V2X communication and the driving state acquired from camera 310 match. If it is determined that they match (Yes in step S305), the procedure advances to step S306. Otherwise (No in step S305), the procedure advances to step S311.

In step S306, matching verifier 930 transmits a notification indicating that the driving state acquired through V2X communication and the driving state acquired from camera 310 match to fraud detection server 80. Step S306 may be omitted.

In step S311, matching verifier 930 transmits a notification indicating that the driving state acquired through V2X communication and the driving state acquired from camera 310 do not match to fraud detection server 80.

Through the set of processing operations shown in FIG. 8, even if a frame uploaded by a fraudulent vehicle, or in other words, a target vehicle is falsified, vehicle 1010*b* can assist fraud detection server 80 in detecting the fraudulent vehicle.

[1.6 Processing Sequence Example 1 between Vehicles and Fraud Detection Server]

Figure 9:
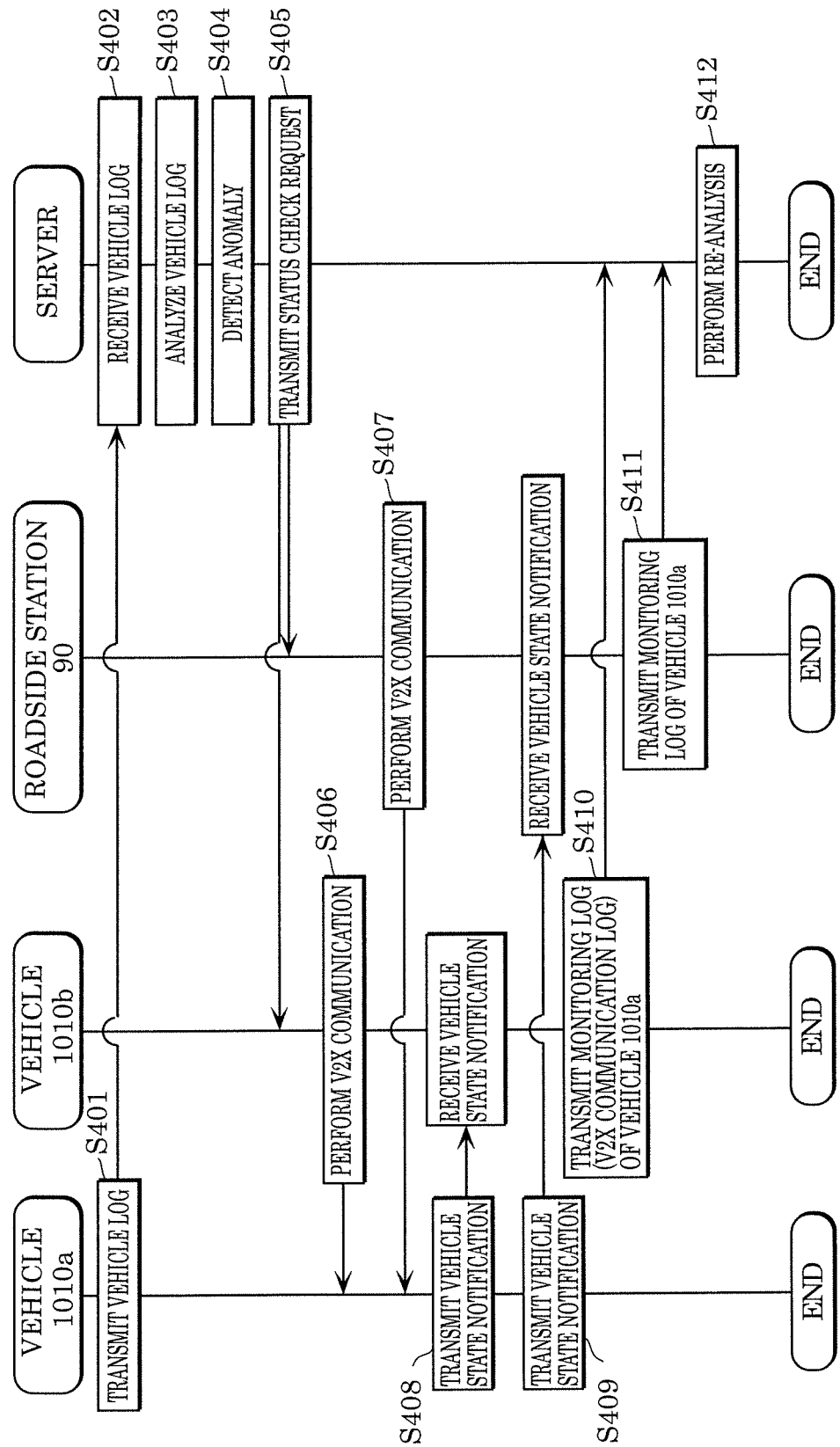
FIG. 9 is a sequence diagram for acquiring a communication log through communication according to the embodiment.

FIG. 9 is a diagram showing an example of a sequence of processing operations performed between vehicles 1010*a* and 1010*b*, roadside station 90, and fraud detection server 80.

First, vehicle 1010*a* transmits a vehicle log such as a CAN log that is communicated within vehicle 1010*a* to fraud detection server 80 (step S401). Fraud detection server 80 receives the vehicle log transmitted from vehicle 1010*a* (step S402).

Upon receiving the vehicle log, fraud detection server 80 analyzes whether or not there is an anomaly in the vehicle log (step S403). If it is determined that there is an anomaly in the vehicle log (step S404), fraud detection server 80 transmits a status check request notification to a vehicle or a roadside station that is present in the same area as vehicle 1010*a* (step S405). In this example, vehicle 1010*b* and roadside station 90 are present in the same area as vehicle 1010*a*, and thus fraud detection server 80 transmits a status check notification to vehicle 1010*b* and roadside station 90. Steps S401 to S405 correspond to, for example, steps S101 to S105 shown in FIG. 5.

If the status check notification destination is a vehicle or a roadside station that is not in the same area as vehicle 1010*a* at this time (or in other words, a vehicle or a roadside station that is not present within a distance where it is possible to perform V2X communication with vehicle 1010*a*), a vehicle or a roadside station that is predicted to be in the same area as vehicle 1010*a* based on a predicted route of vehicle 1010*a* may be included as the status check notification destination.

Vehicle 1010*b* and roadside station 90 that have received the status check request notification perform V2X communication with vehicle 1010*a* (steps S406 and S407), and receive a vehicle state notification regarding the vehicle state of vehicle 1010*a* (for example, vehicle speed, driving direction, acceleration, and the like) (steps S408 and S409). Vehicle 1010*b* and roadside station 90 transmit a V2X communication log including the received vehicle state notification of vehicle 1010*a* to fraud detection server 80 as a monitoring log (steps S410 and S411).

Upon receiving the monitoring logs, fraud detection server 80 performs a re-analysis operation by using the monitoring logs and the vehicle log so as to make a final determination (step S412). In the re-analysis operation, whether the vehicle log and the monitoring logs match may be verified.

FIG. 9 shows a sequence in which fraud detection server 80 receives the monitoring logs after receiving the vehicle log, but fraud detection server 80 may keep receiving the vehicle log and the monitoring logs simultaneously, and verify, for example, whether the speeds notified by the vehicle log and the monitoring logs do not match. If it is determined that the speeds notified by the vehicle log and the monitoring logs do not match, because there is a possibility that any one of the logs is fraudulently falsified, fraud detection server 80 may determine that there is an anomaly and notify a security analyst of the fact. At this time, in the case where fraud detection server 80 receives a plurality of monitoring logs, fraud detection server 80 determines that a group of most matching monitoring logs are correct logs, and also determines that a log (including the vehicle log) that does not match with the group of logs is a falsified log, and then notifies a security analyst of the falsified log and the vehicle that transmitted the falsified log. If it is determined that they match, fraud detection server 80 transmits a notification of the occurrence of an anomaly detected only in the vehicle log to the security analyst. At this time, the monitoring logs are also presented as additional information.

[1.7 Processing Sequence Example 2 between Vehicles and Server]

Figure 10:
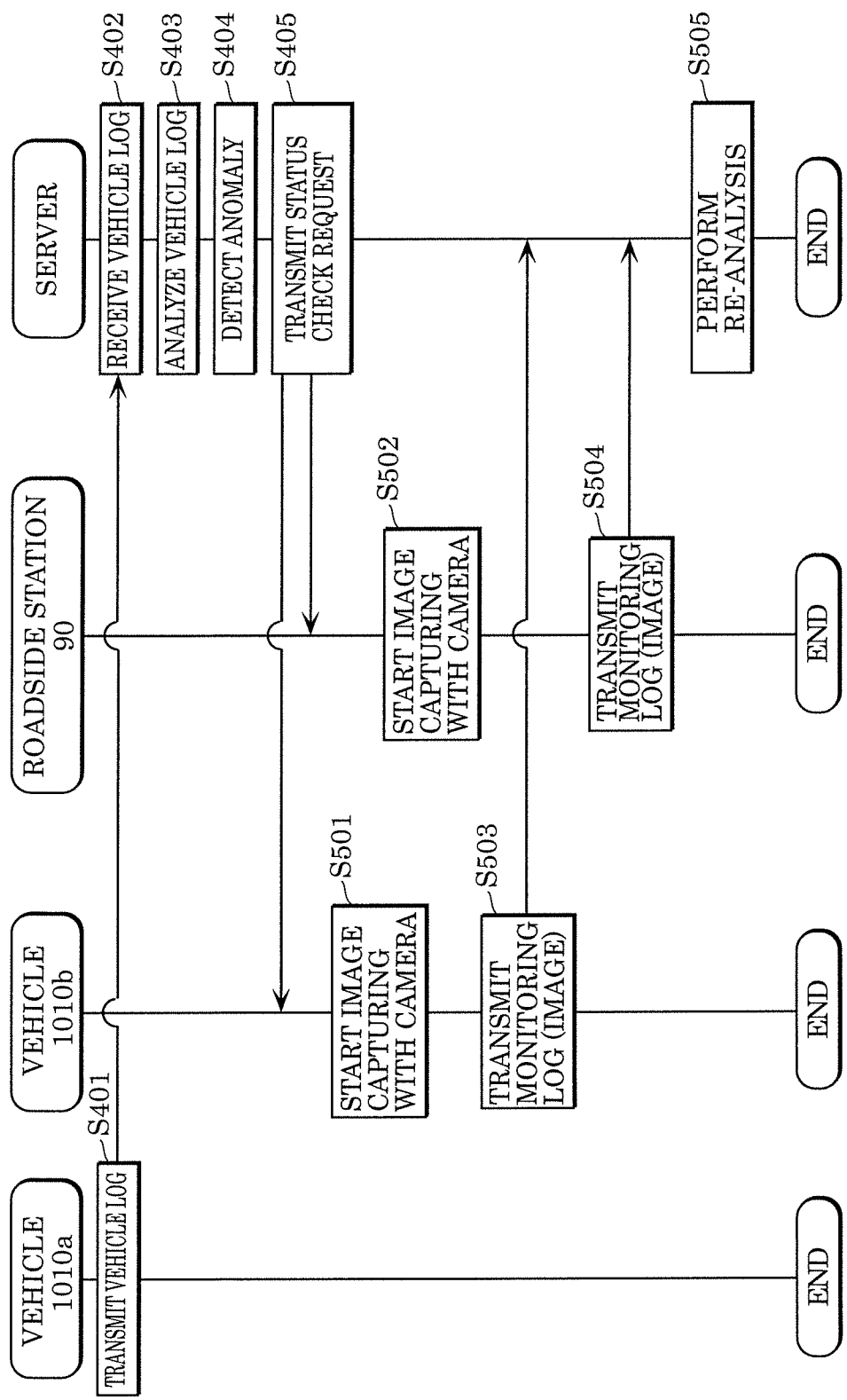
FIG. 10 is a sequence diagram for acquiring a communication log through image capturing using a camera according to the embodiment.

FIG. 10 is a diagram showing processing sequence example 2 that is a sequence of processing operations performed between vehicles 1010*a* and 1010*b*, roadside station 90, and fraud detection server 80. Vehicle 1010*a* transmits a vehicle log to the server, fraud detection server 80 analyzes the vehicle log so as to detect an anomaly. After that, the same processing operations as those (steps S401 to 405) shown in FIG. 10 are performed until a status check request notification is transmitted to vehicle 1010*b* and roadside station 90.

Upon receiving the status check request notification, vehicle 1010*b* and roadside station 90 monitor vehicle 1010*a* by image capturing vehicle 1010*a* by using cameras attached to vehicle 1010*b* and roadside station 90 (steps S501 and S502). At this time, vehicle 1010*b* and roadside station 90 may recognize vehicle 1010*a* by using information transmitted from fraud detection server 80, or may simply acquire a moving image or an image at a specified timing. Having recognized vehicle 1010*a*, vehicle 1010*b* and roadside station 90 may further perform image processing and extract the speed, acceleration/deceleration status, steering state, or the like of vehicle 1010*a*. Also, as the camera, a drive recorder provided in vehicle 1010*b* may be used, and upon receiving a status monitoring request notification from the server, a moving image may be stored. Vehicle 1010*b* and roadside station 90 transmit a monitoring log that includes the acquired image or moving image to fraud detection server 80 (steps S503 and 504).

Upon receiving the monitoring logs, fraud detection server 80 performs a re-analysis operation by using the monitoring logs and the vehicle log (step S505). In the re-analyzing operation, fraud detection server 80 presents the received image or moving image to a security analyst as circumstantial evidence for detecting an anomaly. Also, fraud detection server 80 may be internally provided with an image processing engine so as to perform image processing and extract the vehicle speed, acceleration/deceleration status, steering angle, or the like of vehicle 1010*a*, and verify matching with the vehicle log. Alternatively, if the occurrence of an accident or a vehicle anomaly behavior is detected as a result of image analysis, fraud detection server 80 gives high priority to the detected anomaly, and preferentially transmits a notification of the anomaly to the security analyst.

[1.8 Processing Sequence Example 3 between Vehicles and Fraud Detection Server]

Figure 11:
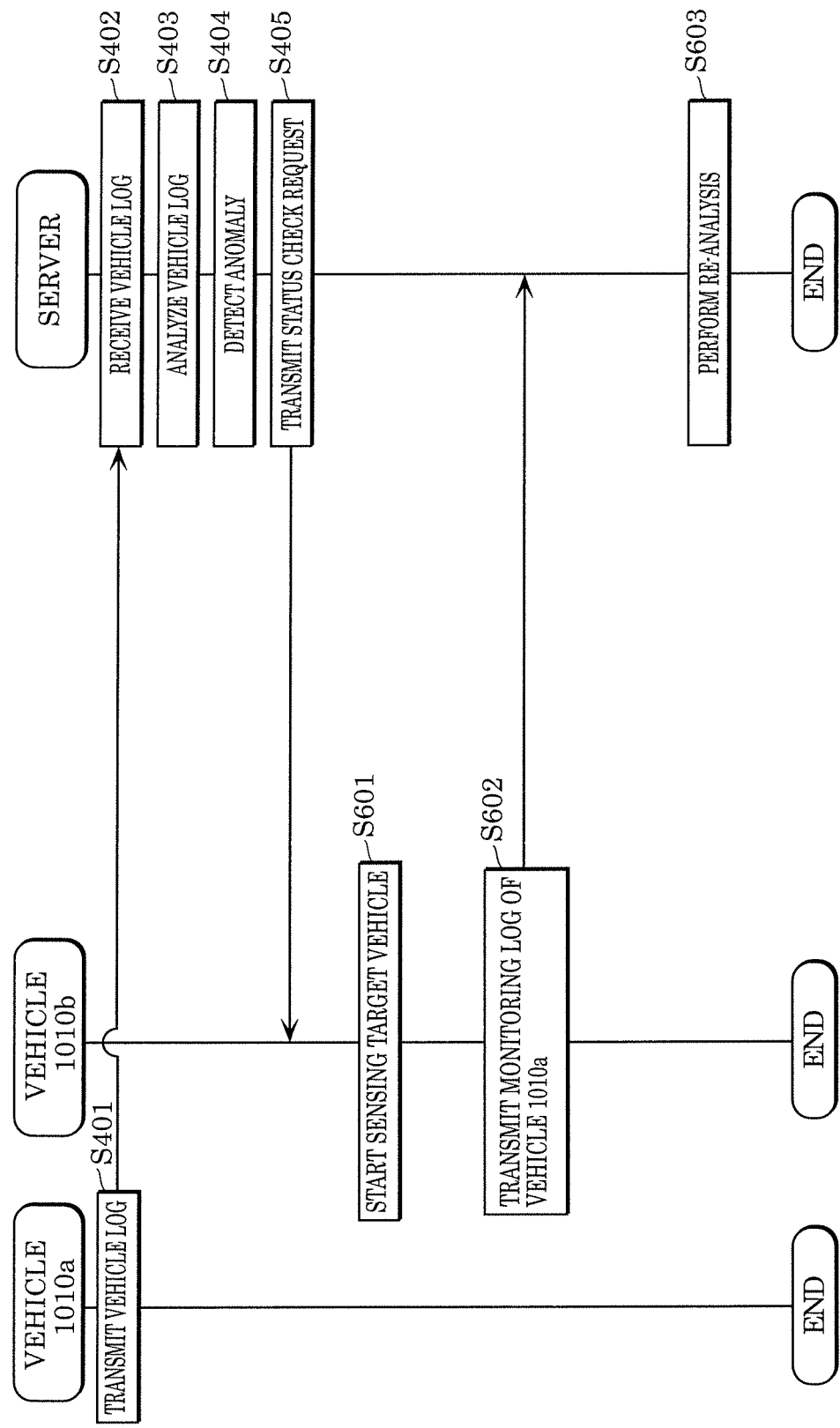
FIG. 11 is a sequence diagram for acquiring a communication log by sensing using a sensor according to the embodiment.

FIG. 11 is a diagram showing processing sequence example 3 that is a sequence of processing operations performed between vehicles 1010*a* and 1010*b*, and fraud detection server 80. The same sequence of operations as those (steps S401 to 405) shown in FIG. 9 or 10 are performed until fraud detection server 80 transmits a status check request to vehicle 1010b. Upon receiving the status check request notification from fraud detection server 80, vehicle 1010b starts sensing the vehicle driving state of vehicle 1010a (step S601). The sensing is performed by using a camera, a radar, or a sensor such as a LiDAR sensor attached to the vehicle. For example, if vehicle 1010a is recognized as a vehicle ahead, vehicle 1010b acquires a relative speed with respect to the vehicle ahead. Vehicle 1010b transmits a monitoring log that includes information regarding vehicle 1010a, on which sensing was performed, to fraud detection server 80 (step S602). Fraud detection server 80 performs a re-analysis operation by using the received monitoring log and the vehicle log so as to verify whether the monitoring log and the vehicle log match (step S603).

[1.9 Processing Sequence Example 4 between Vehicles and Fraud Detection Server]

Figure 12:
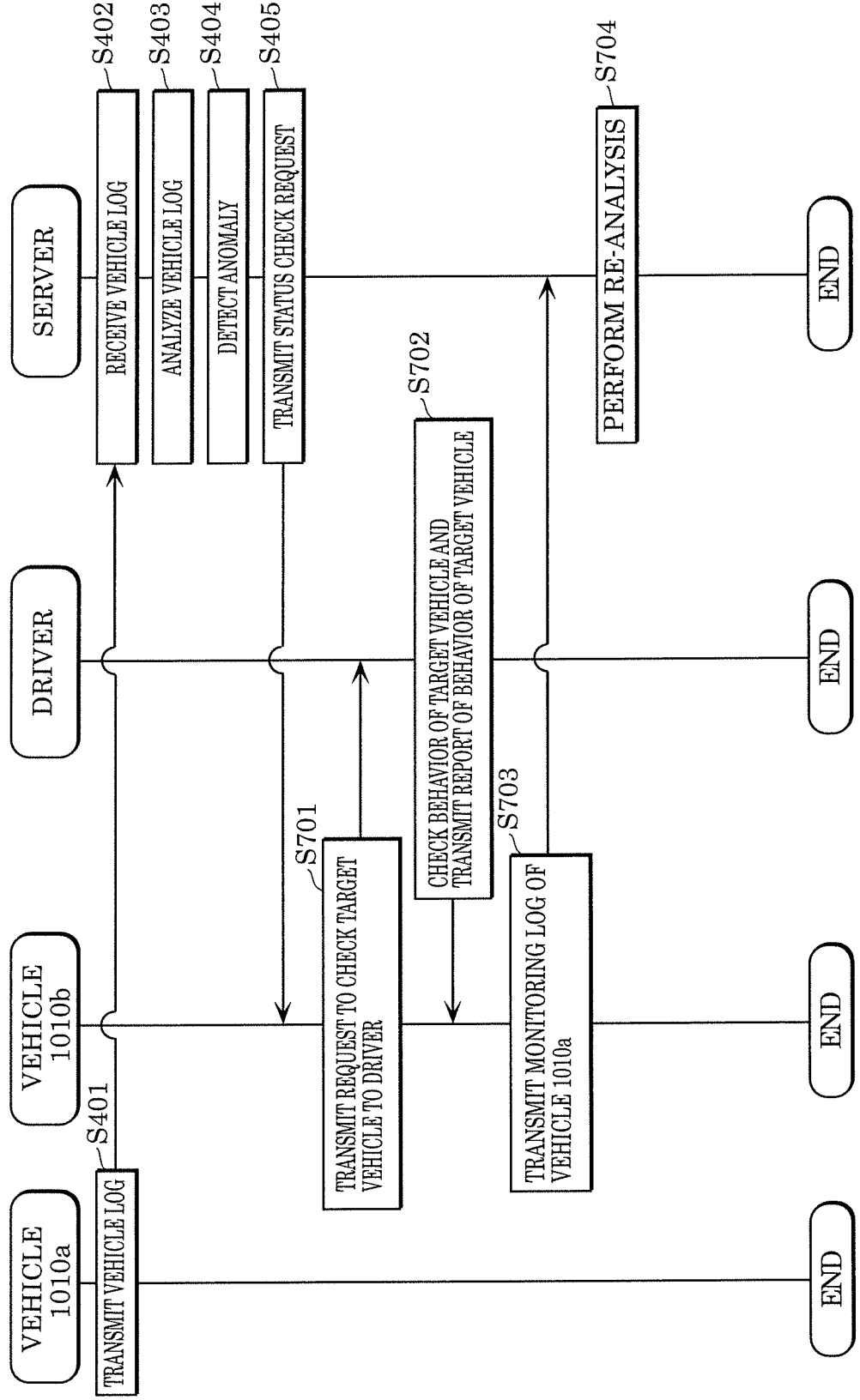
FIG. 12 is a sequence diagram for acquiring a communication log from a driver by sensing according to the embodiment.

FIG. 12 is a diagram showing processing sequence example 4 that is a sequence of processing operations performed between vehicles 1010a and 1010b, and fraud detection server 80. The same sequence of operations as those (steps S401 to 405) shown in FIG. 9, 10 or 11 are performed until fraud detection server 80 transmits a status check request to vehicle 1010b.

Upon receiving the status check notification, vehicle 1010b presents, to the driver of vehicle 1010b, information requesting to check whether there is an anomaly in the surroundings via a display of a head unit or by sound (step S701). The driver checks the status of the surroundings, or in other words, the behaviors of the target vehicle, and inputs the result as a report by sound or by operating a touch panel. Vehicle 1010b receives the input from the driver (step S702). Vehicle 1010b transmits a monitoring log that includes the information received from the driver to fraud detection server 80 (step S703). Fraud detection server 80 performs a re-analysis operation by using the monitoring log and the vehicle log (step S704). In the re-analyzing operation, fraud detection server 80 determines priority that indicates the degree of precedence in which the detected anomaly needs to be analyzed based on the report from the driver, and preferentially transmits a notification of the anomaly in descending order of priority to a security analyst.

As the report from the driver, for example, the driver may select from among "an accident has occurred around the vehicle", "there is an anomalous vehicle that performs sudden steering, sudden braking, or sudden acceleration", "there is an annoying vehicle", and "there is no particular anomaly". Alternatively, the report from the driver in the form of sound information or text information obtained as a result of voice recognition may be included in the monitoring log. With this configuration, the status of the vehicle in which the anomaly has been detected can be obtained quickly and accurately, and priority can be given to the detected log according to the degree of risk, and preferentially notified to a security analyst.

In this example, fraud detection server 80 transmits a status check request to a vehicle that is present in the same area as the vehicle in which the anomaly has been detected, but the notification destination is not limited to vehicle 1010b or roadside station 90. For example, the notification destination may be a terminal on which an application for receiving traffic safety information has been installed. At this time, the application transmits the position information of the terminal to fraud detection server 80, and fraud detection server 80 transmits a status check request notification to the application installed on the terminal if it is determined, based on the position information of the terminal, that the terminal is present near the vehicle in which the anomaly has been detected. The application transmits an anomaly check notification requesting to check whether there is an anomaly in the surroundings to the user of the terminal, and transmits a report from the user of the terminal to fraud detection server 80.

Hereinafter, operation examples of the vehicle-mounted network monitoring system will be described.

Figure 13:
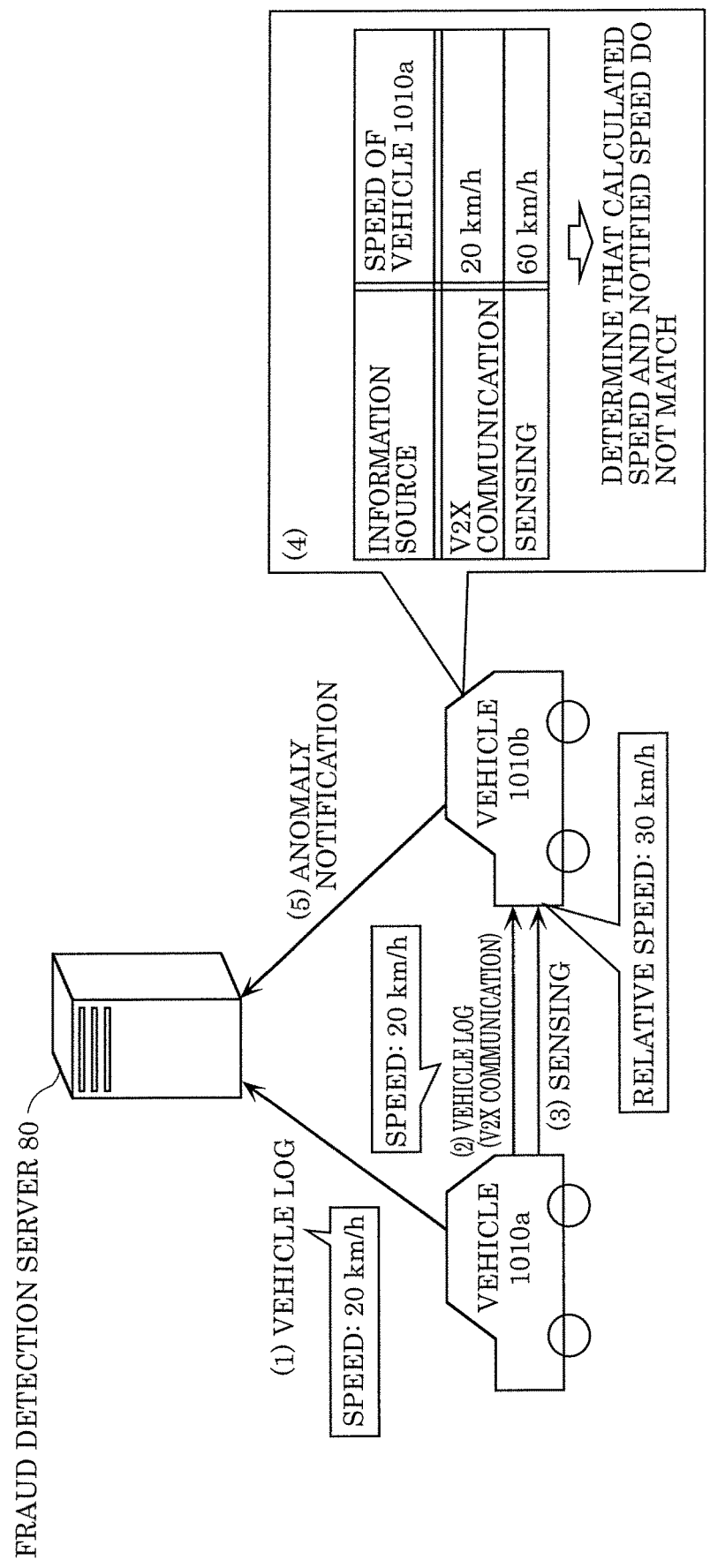
FIG. 13 is a diagram showing a first operation example of the vehicle-mounted network monitoring system according to the embodiment.

FIG. 13 is a diagram showing a first operation example of the vehicle-mounted network monitoring system according to the present embodiment. FIG. 13 shows an example in which vehicle 1010a transmits a fraudulent notification indicating that the vehicle speed is 20 km/h despite the fact that the vehicle speed is 60 km/h to fraud detection server 80 and the like, and fraud detection server 80 detects the fraud of vehicle 1010a. Also, in this example, vehicle 1010b detects the anomaly of vehicle 1010a voluntarily, or in other words, without receiving a notification from fraud detection server 80.

In (1) shown in FIG. 13, vehicle 1010a transmits a fraudulent notification indicating that its vehicle speed is 20 km/h to fraud detection server 80.

In (2), vehicle 1010a transmits a fraudulent notification indicating that its vehicle speed is 20 km/h to vehicle 1010b through V2X communication.

In (3), vehicle 1010b acquires the driving state of vehicle 1010a by sensing vehicle 1010a by using a camera, a radar or the like. It is assumed here that the acquired driving state indicates that the relative speed of vehicle 1010a with respect to vehicle 1010b is 30 km/h.

In (4), vehicle 1010b calculates the speed of vehicle 1010a to be 60 km/h based on the relative speed with respect to vehicle 1010a acquired by sensing in (3) above and the speed (for example, 30 km/h) of vehicle 1010b. Then, vehicle 1010b determines that the calculated speed of vehicle 1010a and the speed of vehicle 1010a notified in (2) above do not match, or in other words, there is an anomaly.

(5) Vehicle 1010b notifies fraud detection server 80 of the detected anomaly.

Figure 14:
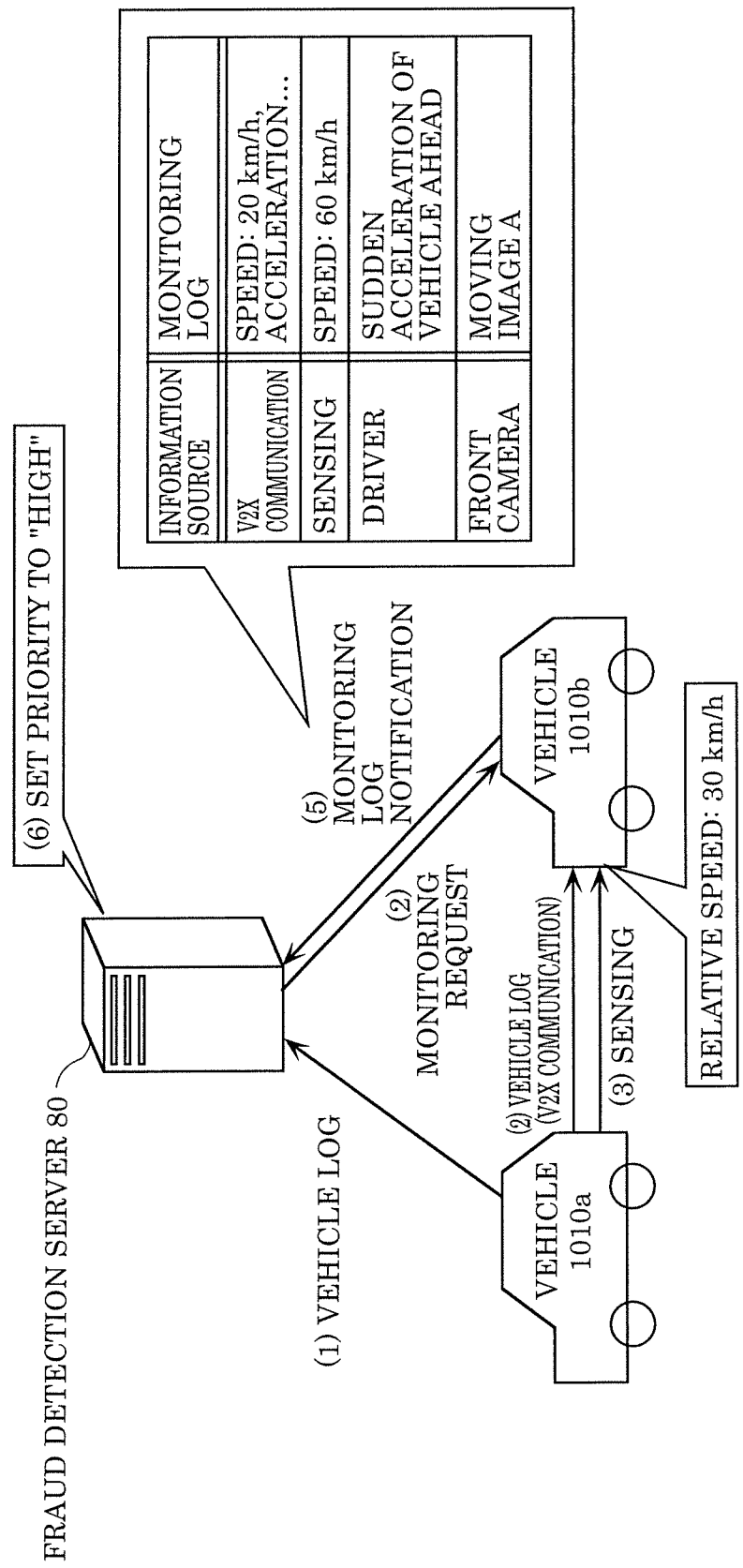
FIG. 14 is a diagram showing a second operation example of the vehicle-mounted network monitoring system according to the embodiment.

FIG. 14 is a diagram showing a second operation example of the vehicle-mounted network monitoring system according to the present embodiment. FIG. 15 is a diagram showing conditions for determining priority based on monitoring logs according to the present embodiment.

FIG. 14 shows an example in which in response to sudden acceleration performed by vehicle 1010a, fraud detection server 80 causes vehicle 1010b to check whether or not vehicle 1010a has actually performed sudden acceleration.

In (1) shown in FIG. 14, vehicle 1010a transmits a vehicle log indicating that vehicle 1010a has performed sudden acceleration to fraud detection server 80.

In (2), fraud detection server 80 analyzes the vehicle log transmitted in (1) above, and detects the occurrence of an anomaly in vehicle 1010a. Then, fraud detection server 80 transmits a request for monitoring vehicle 1010a (also referred to as "monitoring request") to vehicle 1010b that is present near vehicle 1010a. Vehicle 1010b receives the monitoring request transmitted from fraud detection server 80.

In (3), in response to the monitoring request received in (2) above, vehicle 1010b acquires a log (monitoring log) regarding vehicle 1010a through V2X communication.

In (4), in response to the monitoring request received in (2) above, vehicle 1010b acquires the driving state of vehicle 1010a by sensing vehicle 1010a by using a camera, a radar, or the like. As in the case of FIG. 13 described above, it is assumed here that the acquired driving state indicates that the relative speed of vehicle 1010*a* with respect to vehicle 1010*b* is 30 km/h. At this time, question information requesting to check the behaviors of vehicle 1010*a* may be presented to the driver of vehicle 1010*b*, and answer information may be obtained from the driver of vehicle 1010*b*. For example, if vehicle 1010*a* is present in front of vehicle 1010*b*, a question such as "Has the vehicle ahead performed sudden acceleration? Answer with Yes or No" may be presented, and a monitoring log indicating that vehicle 1010*a* has performed sudden acceleration may be generated if an answer indicating "Yes" is obtained.

In (5), vehicle 1010*b* transmits the vehicle log and the monitoring log acquired from vehicle 1010*a* in (3) and (4) above to fraud detection server 80.

In (6), fraud detection server 80 sets the priority of the anomaly detected in (2) above to "high". For determining the priority, for example, to the anomaly indicated by the monitoring log that corresponds to any one of the conditions shown in FIG. 15, priority corresponding to the condition is given.

Figure 16:
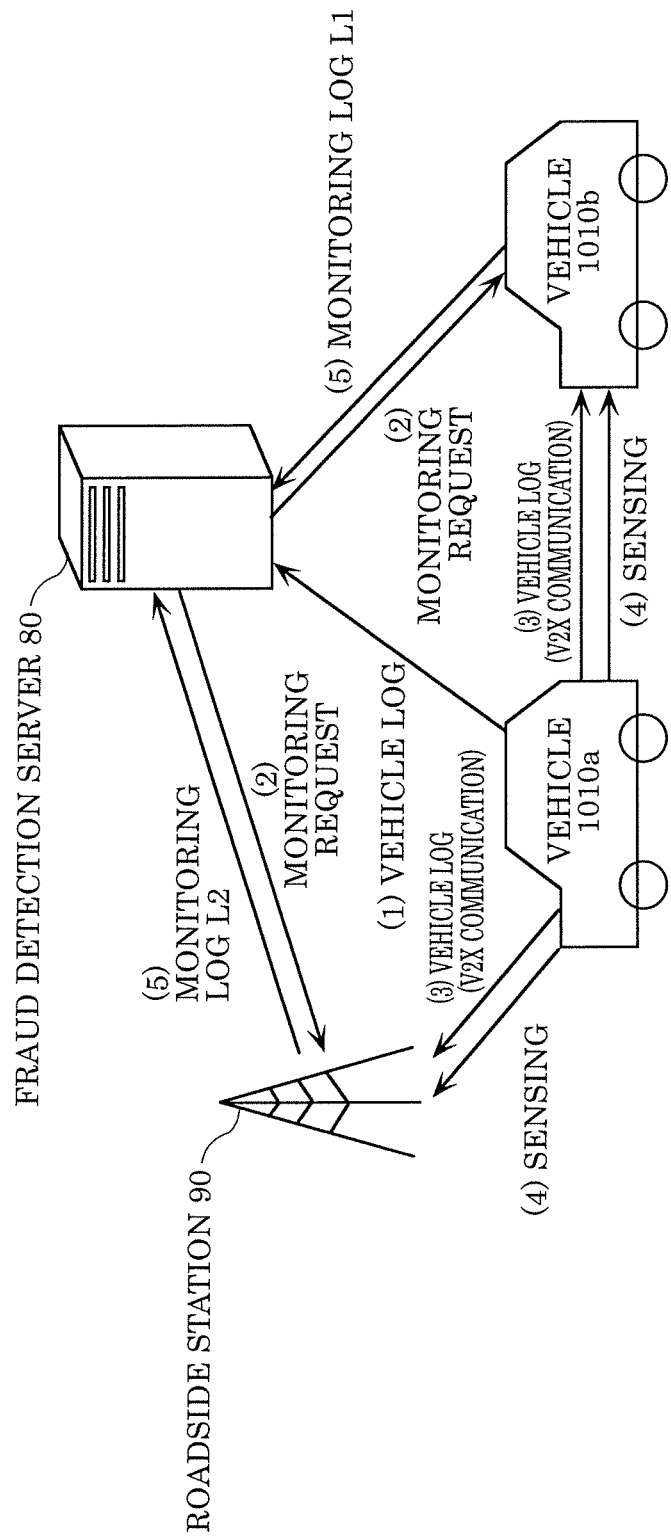
FIG. 16 is a diagram showing a third operation example of the vehicle-mounted network monitoring system according to the embodiment.

FIG. 16 is a diagram showing a third operation example of the vehicle-mounted network monitoring system according to the present embodiment. FIG. 17 is a diagram showing an example of a vehicle log and monitoring logs according to the present embodiment.

FIG. 16 shows an example in which vehicle 1010*a* transmits fraudulent speed information to fraud detection server 80, and vehicle 1010*b* and roadside station 90 obtain the driving state of vehicle 1010*b*.

In FIG. 16, in (1), vehicle 1010*a* transmits fraudulent speed information to fraud detection server 80.

In (2), fraud detection server 80 detects the anomaly in the vehicle log of vehicle 1010*a*. Then, fraud detection server 80 transmits a monitoring request for monitoring vehicle 1010*a* to vehicle 1010*b* and roadside station 90 that are present near vehicle 1010*a*.

In (3), in response to the monitoring request received in (2) above, vehicle 1010*b* acquires a log (monitoring log) regarding vehicle 1010*a* through V2X communication. The same processing is also performed by roadside station 90.

In (4), in response to the monitoring request received in (2) above, vehicle 1010*b* acquires the driving state of vehicle 1010*a* by sensing vehicle 1010*a* by using a camera, a radar, or the like. The same processing is also performed by roadside station 90.

In (5), vehicle 1010*b* transmits the vehicle log and the monitoring log acquired from vehicle 1010*a* in (3) and (4) above to fraud detection server 80. The same processing is also performed by roadside station 90.

In (6), fraud detection server 80 verifies whether the vehicle log and the monitoring log transmitted in (5) above match, and determines the actual driving state of vehicle 1010*b* based on the majority rule. For example, FIG. 17 shows an example of the vehicle log and the monitoring logs transmitted in (5) above. In the diagram, with respect to the vehicle speed, the following five information items are included: "speed: 20 km/h" indicated by the vehicle log; "speed: 0 km/h (acquired by sensing)", and "speed: 20 km/h (acquired through V2X communication)" indicated by monitoring log L1; and "stopping (acquired by camera)" and "speed: 20 km/h (acquired through V2X communication)" indicated by monitoring log L2. If a determination is made simply based on the majority rule, it is determined that the speed of vehicle 1010*b* is 20 km/h. Also, "speed: 20 km/h" indicated by the vehicle log and "speed: 20 km/h" indicated by monitoring logs L1 and L2 may be counted as one considering that the information "speed: 20 km/h" is obtained from a single information source. In this case, if a determination is made based on the majority rule, it is determined that the vehicle speed is 0 km/h.

(Variation of Embodiment)

In the present variation, a description will be given of an alternative form of the vehicle monitoring apparatus, the fraud detection server, and the control methods according to the embodiment described above.

Figure 18:
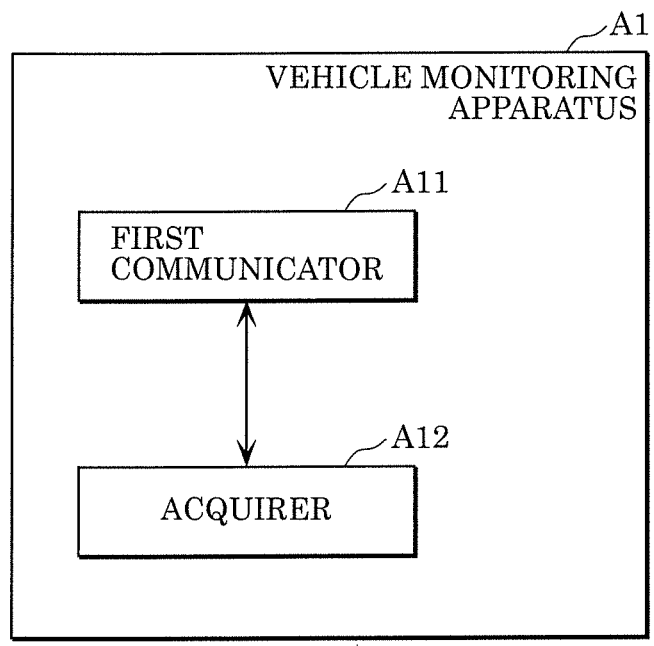
FIG. 18 is a block diagram showing a functional configuration of a vehicle monitoring apparatus according to a variation of the embodiment.

FIG. 18 is a block diagram showing a functional configuration of vehicle monitoring apparatus A1 according to the present embodiment.

As shown in FIG. 18, vehicle monitoring apparatus A1 includes first communicator A11 and acquirer A12.

First communicator A11 receives specifying information for specifying a target vehicle from fraud detection server A2. Also, first communicator A11 transmits driving information acquired by acquirer A12 to fraud detection server A2.

Acquirer A12 acquires driving information from the target vehicle, the driving information being information regarding driving of the target vehicle specified by the specifying information received by first communicator A11.

Figure 19:
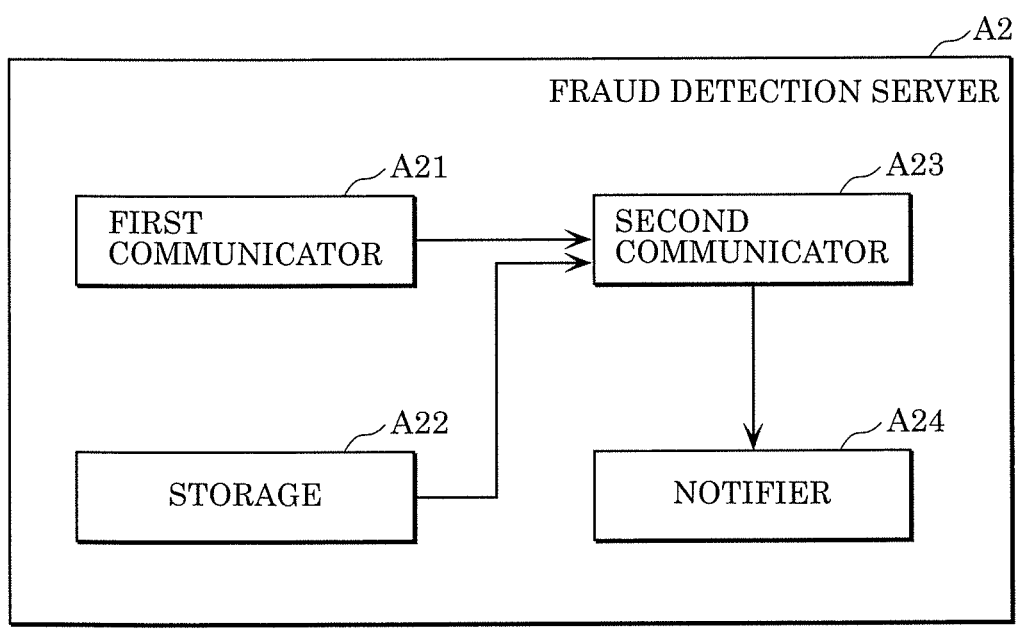
FIG. 19 is a block diagram showing a functional configuration of a fraud detection server according to a variation of the embodiment.

FIG. 19 is a block diagram showing a functional configuration of fraud detection server A2 according to the present variation.

As shown in FIG. 19, fraud detection server A2 includes first communicator A21, storage A22, second communicator A23, and notifier A24.

First communicator A21 receives first driving information that is information regarding driving of the target vehicle.

Storage A22 stores position information that indicates the current positions of a plurality of vehicles.

Second communicator A23 performs: an operation (a) of, when an anomaly is detected in the first driving information received from the target vehicle, specifying one or more vehicles that are present within a predetermined distance from the target vehicle from among the plurality of vehicles by referencing the position information, and transmitting a notification requesting for second driving information regarding driving of the target vehicle to each vehicle monitoring apparatus of the one or more vehicles specified, and an operation (b) of receiving the second driving information from vehicle monitoring apparatus A1 of the one or more vehicles.

Notifier A24 determines priority based on the first driving information and the second driving information, the priority indicating the degree of precedence in which the anomaly needs to be preferentially analyzed, and more preferentially transmits a notification of the anomaly as the anomaly has higher priority.

Figure 20:
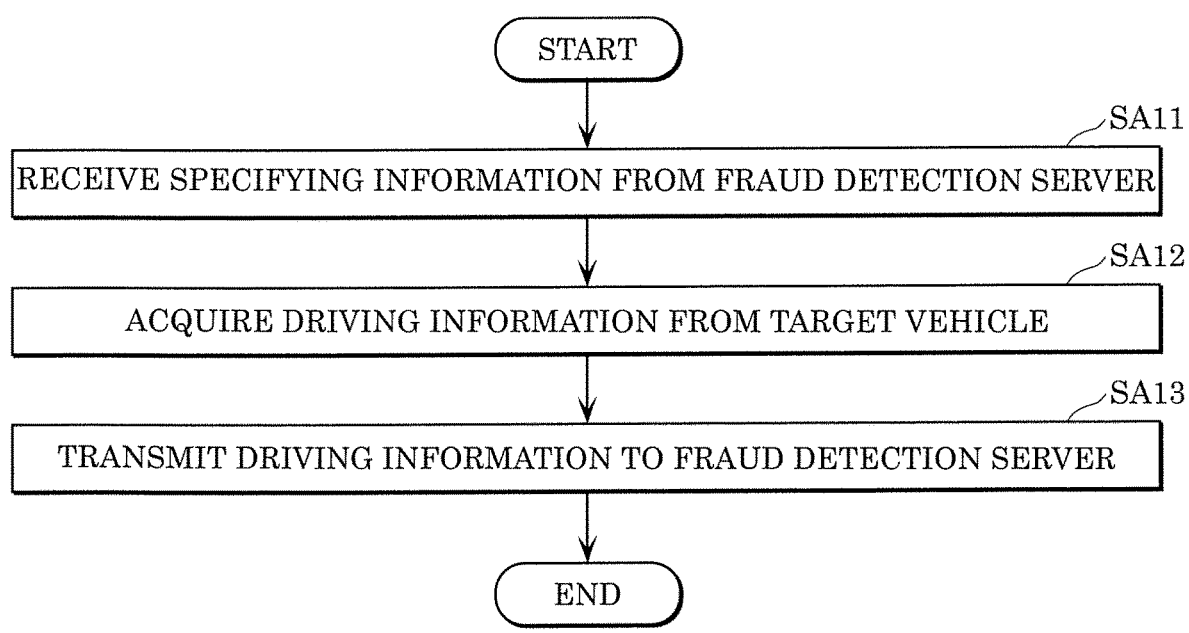
FIG. 20 is a flowchart illustrating a control method for controlling a vehicle monitoring apparatus according to a variation of the embodiment.

FIG. 20 is a flowchart illustrating a control method for controlling vehicle monitoring apparatus A1 according to the present variation.

As shown in FIG. 20, in step SA11, specifying information for specifying a target vehicle is received from fraud detection server A2.

In step SA12, driving information is acquired from the target vehicle, the driving information being information regarding driving of the target vehicle specified by the specifying information received in step SA11.

In step SA13, the driving information acquired in step SA12 is transmitted to fraud detection server A2.

Figure 21:
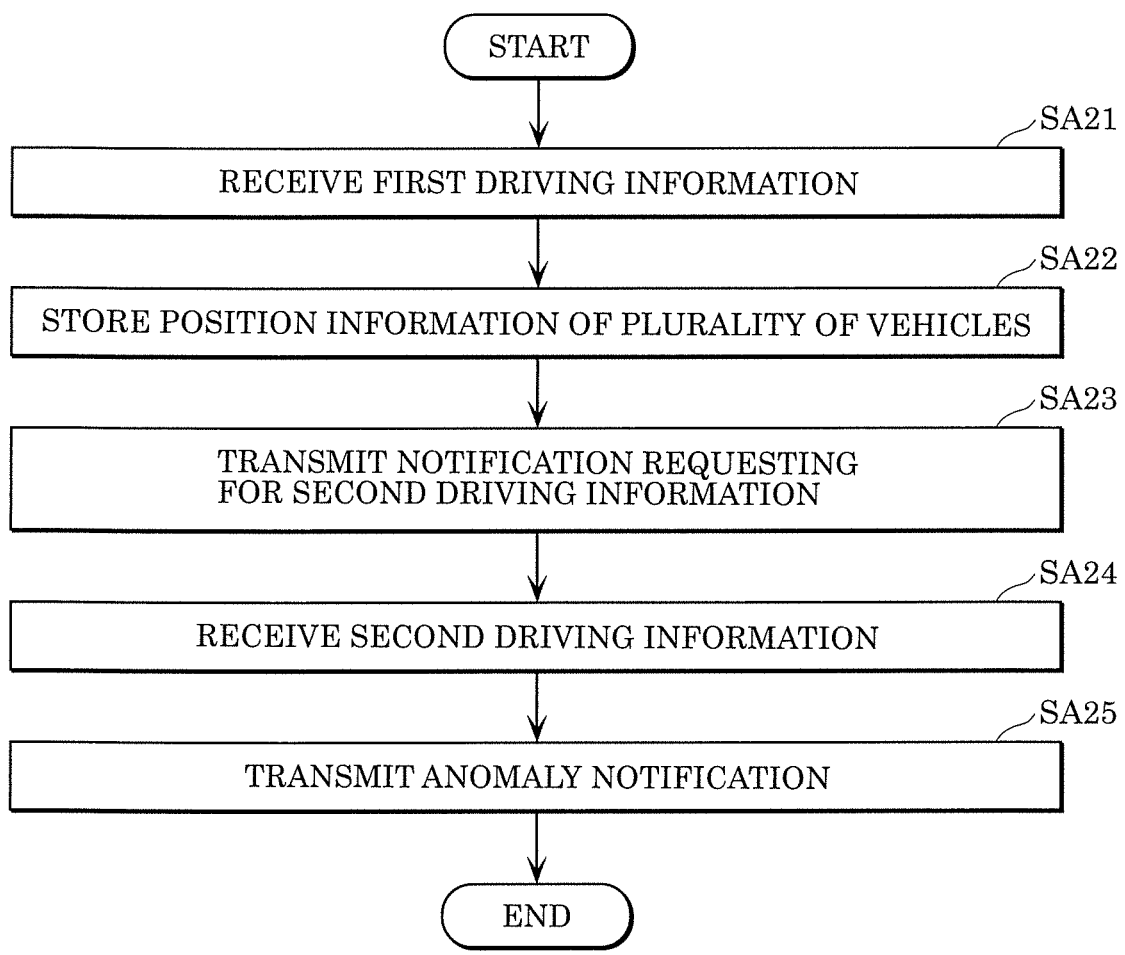
FIG. 21 is a flowchart illustrating a control method for controlling a fraud detection server according to a variation of the embodiment.

FIG. 21 is a flowchart illustrating a control method for controlling fraud detection server A2 according to the present variation.

As shown in FIG. 21, in step SA21, first driving information, which is information regarding driving of the target vehicle, is received.

In step SA22, position information that indicates the current positions of a plurality of vehicles is stored.

In step SA23, if an anomaly is detected in the first driving information received from the target vehicle, one or more vehicles that are present within a predetermined distance from the target vehicle are specified from among the plurality of vehicles by referencing the position information, and a notification requesting for second driving information regarding driving of the target vehicle is transmitted to each vehicle monitoring apparatus A1 of the one or more vehicles specified.

In step SA24, the second driving information is received from each vehicle monitoring apparatus A1 of the one or more vehicles.

In step SA25, priority that indicates the degree of precedence in which an anomaly needs to be preferentially analyzed is determined based on the first driving information and the second driving information, and an anomaly notification is more preferentially provided as the anomaly has higher priority.

Through the above processing operations, even if a frame uploaded by a fraudulent vehicle is falsified, vehicle monitoring apparatus A1 can assist in detecting the fraudulent vehicle.

Also, even if a frame uploaded by a fraudulent vehicle is falsified, fraud detection server A2 can detect the fraudulent vehicle.

As described above, with the vehicle monitoring apparatus according to each of the embodiment and the variation described above, the vehicle monitoring apparatus acquires driving information of the target vehicle specified by specifying information obtained from the server from the target vehicle, and transmits the acquired driving information to the server. Accordingly, even if a frame uploaded to the server by the target vehicle is falsified, the server can detect the fraud of the target vehicle based on the driving information of the target vehicle transmitted to the server by the vehicle monitoring apparatus. Thus, even if a frame uploaded by a fraudulent vehicle is falsified, the vehicle monitoring apparatus can assist in detecting the fraudulent vehicle.

Also, the vehicle monitoring apparatus acquires driving information obtained through communication with the specified vehicle. Accordingly, even if a frame uploaded by a fraudulent vehicle is falsified, the vehicle monitoring apparatus can more easily obtain the driving information of the target vehicle and assist in detecting the fraudulent vehicle.

Also, the vehicle monitoring apparatus acquires the driving information obtained by sensing the specified vehicle. Accordingly, even if a frame uploaded by a fraudulent vehicle is falsified, the vehicle monitoring apparatus can more easily obtain the driving information of the target vehicle and assist in detecting the fraudulent vehicle.

Also, the vehicle monitoring apparatus acquires the driving information obtained by sensing the specified vehicle. Accordingly, even if a frame uploaded by a fraudulent vehicle is falsified, the vehicle monitoring apparatus can more easily obtain the driving information of the target vehicle and assist in detecting the fraudulent vehicle.

Also, the vehicle monitoring apparatus acquires a result of determination of the driver with respect to the driving state of the target vehicle by sensing. Accordingly, even if a frame uploaded by a fraudulent vehicle is falsified, the vehicle monitoring apparatus can assist in detecting the fraudulent vehicle by using the driving information of the target vehicle obtained from even more information sources.

Also, the vehicle monitoring apparatus can detect, in particular, a fraud in the speed of the target vehicle. Accordingly, even if a frame in which particularly the vehicle speed is falsified is uploaded by a fraudulent vehicle, the vehicle monitoring apparatus can assist in detecting the fraudulent vehicle.

Also, the fraud detection server according to each of the embodiment and the variation described above causes the vehicle monitoring apparatus of a vehicle(s) present within a predetermined distance from the target vehicle to acquire a driving state of the target vehicle from the target vehicle. Accordingly, even if a frame uploaded to the server by the target vehicle is falsified, the server can detect the fraud of the target vehicle based on the driving information of the target vehicle transmitted to the server by the vehicle monitoring apparatus. Thus, even if a frame uploaded by a fraudulent vehicle is falsified, the fraud detection server can detect the fraudulent vehicle.

Also, if the driving information of the target vehicle acquired through communication and the driving information of the target vehicle acquired by sensing do not match, the fraud detection server more preferentially transmits a notification of the anomaly to an analyst or the like. Accordingly, if the driving information of the target vehicle acquired through communication and the driving information of the target vehicle acquired by sensing do not match, it is possible to cause the analyst or the like to more preferentially take necessary measures.

(Other Variations)

The present disclosure has been described by way of the embodiment above, but the present disclosure is, of course, not limited to the embodiment described above. The present disclosure also encompasses the following variations.

(1) The above embodiment has been described assuming that the vehicle-mounted network is a CAN, but the present disclosure is not limited thereto. The vehicle-mounted network may be a CAN-FD, an Ethernet, a LIN, a Flex Ray, or a combination thereof.

(2) In the embodiment described above, anomaly detection processing based on machine learning is performed on the cloud server side, but may be performed in an apparatus provided in a vehicle. For example, the processing may be performed by a GPU in a head unit. By doing so, it is possible to increase the real-time detection ability. In this case, results of anomaly detection performed locally in vehicles may be collected on the cloud server side. At this time, the priority of processing may be calculated in the head unit, or by another apparatus such as, for example, a gateway, and may be notified by being included in a CAN message.

(3) In the embodiment described above, pre-processing when feature vectors are generated is performed on the local side, but may be performed on the cloud server side.

(4) In the embodiment described above, anomaly detection processing is performed on the cloud server side, but may be performed by an edge server with an environment closer to the local environment. By doing so, the influence of network delay processing is reduced as compared with when anomaly detection processing is performed on the cloud side. For example, the edge server may be a roadside station connected to a cloud server, and a vehicle may upload in-vehicle message information to the roadside station such that the roadside station can perform anomaly detection processing and upload a result of anomaly detection to the cloud server.

(5) In the embodiment described above, when an anomaly is detected on the vehicle side or the cloud server side, an alert is transmitted to the administrator of the vehicle-mounted network monitoring system, but the present disclosure is not limited thereto. For example, an alert may be transmitted to an automobile manufacturer, an ECU supplier, or a user-owned information terminal. Alternatively, an alert may be transmitted to a security provider that can be used commonly between a plurality of automobile manufacturers.

(6) In the embodiment described above, the priority may take any one of three values: low, medium and high, but the priority is not limited thereto. For example, the priority may be indicated by a score of 0 to 100. This configuration is effective because the fraud detection server can finely assign priority.

(7) In the embodiment described above, the vehicle log transmitted to the fraud detection server includes information regarding a CAN frame, but the vehicle log transmitted to the fraud detection server is not limited thereto. For example, the vehicle log may include, for example, an Ethernet frame, a CAN-FD frame, or a Flex Ray frame, and the vehicle log may not necessarily include a vehicle-mounted network frame. For example, the vehicle log may include information such as GPS information that indicates the current vehicle position, an access log to an audio head unit, a log regarding an operation process, firmware version information, or V2X communication log information.

(8) In the embodiment described above, upon receiving a monitoring request notification, the vehicle or the roadside station transmits a monitoring log that includes information acquired through V2X communication and the sensor (camera or radar) and a report from the driver to the fraud detection server, but it is sufficient to transmit any one of the information acquired through V2X communication and the sensor and the report from the driver as a monitoring log. Also, the fraud detection server may transmit a monitoring request notification including information indicating what kind of monitoring log is necessary. For example, the fraud detection server may transmit a monitoring request notification requesting for sensor information to a vehicle behind, a monitoring request notification requesting for a V2X communication log to a vehicle other than the vehicle behind, and a monitoring request notification requesting for a driver's report to a vehicle determined as being present outside the V2X communication range but present in the surroundings. With this configuration, appropriate information can be efficiently collected based on the positional relationship relative to the vehicle in which the anomaly has been detected.

(9) Each apparatus according to the embodiment described above is, specifically, a computer system composed of a microprocessor, a ROM, a RAM, a hard disk unit, a display unit, a keyboard, a mouse, and the like. A computer program is recorded in the RAM or the hard disk unit. By the microprocessor operating in accordance with the computer program, each apparatus achieves its function. Here, the computer program is composed of a combination of a plurality of instruction codes indicating instructions for the computer to achieve predetermined functions.

(10) Some or all of the structural elements of each apparatus according to the embodiment described above may be composed of one system LSI (large scale integration circuit). The system LSI is a super-multifunctional LSI produced by integrating a plurality of components on a single chip, and specifically is a computer system composed of a microprocessor, a ROM, a RAM, and the like. A computer program is recorded in the RAM. By the microprocessor operating in accordance with the computer program, the system LSI achieves its function.

Also, the structural elements that constitute each apparatus according to the embodiment described above may be individual single chips, or some or all of them may be configured in a single chip.

Also, a system LSI is used here, but the LSI may be called IC, LSI, super LSI, or ultra LSI according to the degree of integration. Also, implementation of an integrated circuit is not necessarily limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Furthermore, if a technique for implementing an integrated circuit that can replace LSIs appears by another technique resulting from the progress or derivation of semiconductor technology, of course, the functional blocks may be integrated by using that technique. Application of biotechnology or the like is possible.

(11) Some or all of the structural elements of each apparatus according to the embodiment described above may be composed of a removable IC card or a single module. The IC card or the module is a computer system composed of a microprocessor, a ROM, a RAM, and the like. The IC card or the module may include a super-multifunctional LSI as described above. By the microprocessor operating in accordance with a computer program, the IC card or the module achieve its function. The IC card or the module may be tamper resistant.

(12) The present disclosure may be any of the methods described above. Also, the present disclosure may be a computer program that causes a computer to implement the methods, or may be a digital signal from the computer program.

Also, the present disclosure may be configured such that the computer program or the digital signal is recorded in a computer-readable recording medium such as a flexible disk, a hard disk, a CD-ROM, a MO, a DVD, a DVD-ROM, a DVD-RAM, a BD (Blu-ray® Disc), or a semiconductor memory. Also, the present disclosure may be configured such that the digital signal is recorded in the recording media.

Also, the present disclosure may be configured to transmit the computer program or the digital signal via an electric communication line, a wireless or wired communication line, a network as typified by the Internet, data broadcast, or the like.

Also, the present disclosure may be a computer system that includes a microprocessor and a memory, wherein the computer program is recorded in the memory, and the microprocessor operates in accordance with the computer program.

Also, the present disclosure may be configured such that the program or the digital signal recorded in the recording medium is transferred, or the program or the digital signal is transferred via a network or the like, and executed by another independent computer system.

(13) The embodiment and the variations described above may be combined as appropriate.

In the embodiment and the variations described above, the structural elements may be configured using dedicated hardware, or may be implemented by execution of a software program suitable for the structural elements. The structural elements may be implemented by a program executor such as a CPU or a processor reading a software program recorded in a recording medium such as a hard disk or a semiconductor memory and executing the software program. Here, the software that implements the vehicle monitoring apparatus or the like according to the embodiment or the variations described above includes a program as described below.

That is, the program causes a computer to execute a control method for controlling a vehicle monitoring apparatus, the method including: receiving specifying information for specifying a target vehicle from a server; acquiring driving information from the target vehicle, the driving information being information regarding driving of the target vehicle specified by the specifying information received; and transmitting the driving information acquired to the server.

Also, the program causes a computer to execute a control method for controlling a fraud detection server, the method including: receiving first driving information that is information regarding driving of a target vehicle; storing position information that indicates current positions of a plurality of vehicles; when an anomaly is detected in the first driving information received from the target vehicle, specifying one or more vehicles that are present within a predetermined distance from the target vehicle from among the plurality of vehicles by referencing the position information, and transmitting a notification requesting for second driving information regarding driving of the target vehicle to a vehicle monitoring apparatus of each of the one or more vehicles specified; receiving the second driving information from the vehicle monitoring apparatus of the one or more vehicles; and determining priority based on the first driving information and the second driving information, the priority indicating a degree of precedence in which the anomaly needs to be preferentially analyzed, and more preferentially transmitting a notification of the anomaly as the anomaly has higher priority.

Up to here, the vehicle monitoring apparatus and the like according to one or more aspects have been described above by way of the embodiment, but the present disclosure is not limited to the embodiment given above. Other embodiments obtained by making various modifications that can be conceived by a person having ordinary skill in the art to the above embodiment as well as embodiments constructed by combining structural elements of different embodiments without departing from the scope of the present disclosure are also included within the scope of the one or more aspects.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a vehicle monitoring apparatus that monitors vehicles.

What is claimed is:
1. A vehicle monitoring apparatus which assists in detecting that a target vehicle is a fraudulent vehicle, the vehicle monitoring apparatus comprising:
   a first communicator that receives specifying information for specifying the target vehicle from a server;
   a processor; and
   a memory storing at least one set of instructions that, when executed by the processor causes the processor to perform operations including:
   acquiring driving information from the target vehicle, the driving information being information regarding driving of the target vehicle specified by the specifying information received by the first communicator,
   wherein the driving information of the target vehicle includes speed information that indicates a speed of the target vehicle,
   wherein the first communicator transmits the driving information acquired to the server,
   wherein, in the acquiring, the driving information obtained from the target vehicle through communication is obtained,
   wherein, in the acquiring, the driving information obtained by sensing the target vehicle is obtained,
   wherein the operations further include: determining whether or not first driving information that is the driving information obtained through the communication and second driving information that is the driving information obtained by the sensing match, and
   wherein the first communicator transmits the first driving information and the second driving information to the server only when it is determined in the determining that the first driving information and the second driving information do not match.
2. The vehicle monitoring apparatus according to claim 1, wherein the vehicle monitoring apparatus is provided in a vehicle, and
   in the acquiring, it is presented, to a driver of the vehicle, question information for asking a driving state of the target vehicle, and the driving information based on answer information to the question information acquired from the driver by sensing is acquired.
3. A fraud detection server which assists in detecting that a target vehicle is a fraudulent vehicle, the fraud detection server comprising:
   a first communicator that receives first driving information that is information regarding driving of the target vehicle;
   a second communicator that receives second driving information from the vehicle monitoring apparatus of one or more vehicles other than the target vehicle;
   wherein the first driving information and the second driving information includes speed information that indicates vehicle speed,
   a memory that stores position information that indicates current positions of the one or more vehicles other than the target vehicle;
   a processor; and
   the memory storing at least one set of instructions that, when executed by the processor causes the processor to perform operations including:
      when an anomaly is detected in the first driving information received from the target vehicle, specifying the one or more vehicles other than the target vehicle that are present within a predetermined distance from the target vehicle from among the one or more vehicles other than the target vehicle by referencing the position information, and transmitting a notifi- cation requesting for second driving information regarding driving of the target vehicle to a vehicle monitoring apparatus of each of the one or more vehicles specified, an anomaly being a condition in which a frame received by a vehicle-mounted network of the target vehicle is fraudulent; and determining priority based on the first driving information and the second driving information, the priority indicating a degree of precedence in which the anomaly needs to be preferentially analyzed, and more preferentially transmitting a notification of the anomaly as the anomaly has higher priority, wherein, when it is determined that the first driving information and the second driving information do not match, higher priority is given in the notification to the anomaly detected in the first driving information.

4. A control method for controlling a vehicle monitoring apparatus which assists in detecting that a target vehicle is a fraudulent vehicle, the control method comprising:

receiving specifying information for specifying the target vehicle from a server;

acquiring driving information from the target vehicle, the driving information being information regarding driving of the target vehicle specified by the specifying information received, wherein the driving information of the target vehicle includes speed information that indicates a speed of the target vehicle; and transmitting the driving information acquired to the server, wherein, in the acquiring, the driving information obtained from the target vehicle through communication is obtained, wherein, in the acquiring, the driving information obtained by sensing the target vehicle is obtained, wherein the control method further includes: determining whether or not first driving information that is the driving information obtained through the communication and second driving information that is the driving information obtained by the sensing match, and wherein the first driving information and the second driving information are transmitted to the server only when it is determined in the determining that the first driving information and the second driving information do not match.

5. A control method for controlling a fraud detection server which assists in detecting that a target vehicle is a fraudulent vehicle, the control method comprising:

receiving first driving information that is information regarding driving of the target vehicle;

storing position information that indicates current positions of a plurality of vehicles other than the target vehicle;

when an anomaly is detected in the first driving information received from the target vehicle, specifying one or more vehicles other than the target vehicle that are present within a predetermined distance from the target vehicle from among the plurality of vehicles other than the target vehicle by referencing the position information, and transmitting a notification requesting for second driving information regarding driving of the target vehicle to a vehicle monitoring apparatus of each of the one or more vehicles specified, an anomaly being a condition in which a frame received by a vehicle-mounted network of the target vehicle is fraudulent;

receiving the second driving information from the vehicle monitoring apparatus of the one or more vehicles other than the target vehicle; and determining priority based on the first driving information and the second driving information, the priority indicating a degree of precedence in which the anomaly needs to be preferentially analyzed, and more preferentially transmitting a notification of the anomaly as the anomaly has higher priority, wherein the first driving information and the second driving information includes speed information that indicates vehicle speed, wherein, when it is determined that the first driving information and the second driving information do not match, higher priority is given in the notification to the anomaly detected in the first driving information.

* * * * *